(12) United States Patent
Davis et al.

(10) Patent No.: US 12,005,679 B2
(45) Date of Patent: Jun. 11, 2024

(54) LAMINATED VEHICLE GLAZING, ASSOCIATED DEVICE HAVING A NEAR-INFRARED VISION SYSTEM, AND PRODUCTION THEREOF

(71) Applicant: SAINT-GOBAIN GLASS FRANCE, Courbevoie (FR)

(72) Inventors: Claire Davis, Compiegne (FR); Keihann Yavari, Margny-les-Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/790,644

(22) PCT Filed: Dec. 23, 2020

(86) PCT No.: PCT/FR2020/052614
§ 371 (c)(1),
(2) Date: Jul. 1, 2022

(87) PCT Pub. No.: WO2021/136907
PCT Pub. Date: Jul. 8, 2021

(65) Prior Publication Data
US 2023/0052395 A1    Feb. 16, 2023

(30) Foreign Application Priority Data

Jan. 3, 2020   (FR) ...................................... 2000022

(51) Int. Cl.
*B32B 3/24*    (2006.01)
*B32B 3/26*    (2006.01)
(Continued)

(52) U.S. Cl.
CPC ........ *B32B 17/10293* (2013.01); *B32B 3/266* (2013.01); *B32B 7/12* (2013.01);
(Continued)

(58) Field of Classification Search
CPC .......................... B32B 17/10293; B32B 3/266
See application file for complete search history.

(56) References Cited

U.S. PATENT DOCUMENTS 5,162,046 A    11/1992   Mercado
6,132,882 A    10/2000   Landin et al.
(Continued)

FOREIGN PATENT DOCUMENTS

CN           111409314 A     7/2020
DE      20 2019 103729 U1    7/2019
(Continued)

OTHER PUBLICATIONS

International Search Report as issued in International Patent Application No. PCT/FR2020/052614, dated May 25, 2021.
(Continued)

*Primary Examiner* — William P Watkins, III
(74) *Attorney, Agent, or Firm* — Pillsbury Winthrop Shaw Pittman LLP

(57) ABSTRACT

A vehicle laminated glazing includes a first extraclear glass sheet, a lamination interlayer and a second glass or plastic sheet with a traversing hole in the lamination interlayer and the second glass or plastic sheet.

28 Claims, 14 Drawing Sheets

Figure 3:
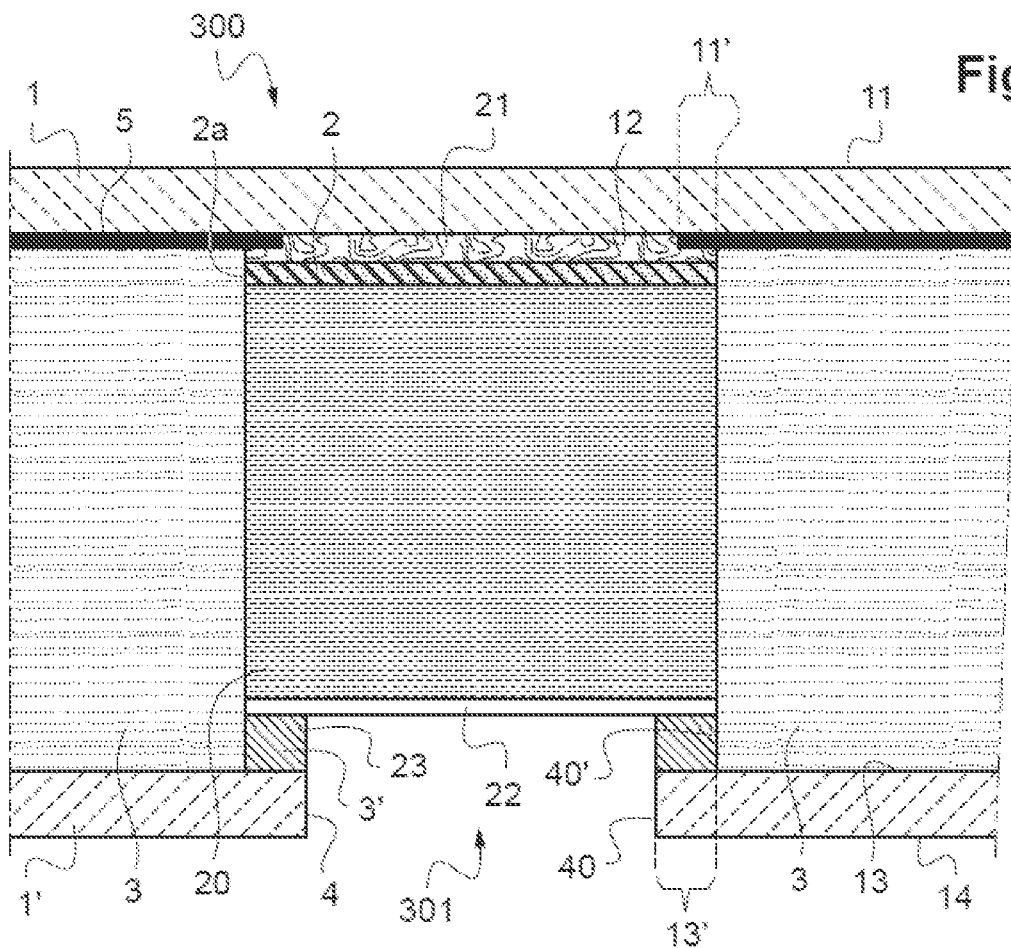
Figure 3:
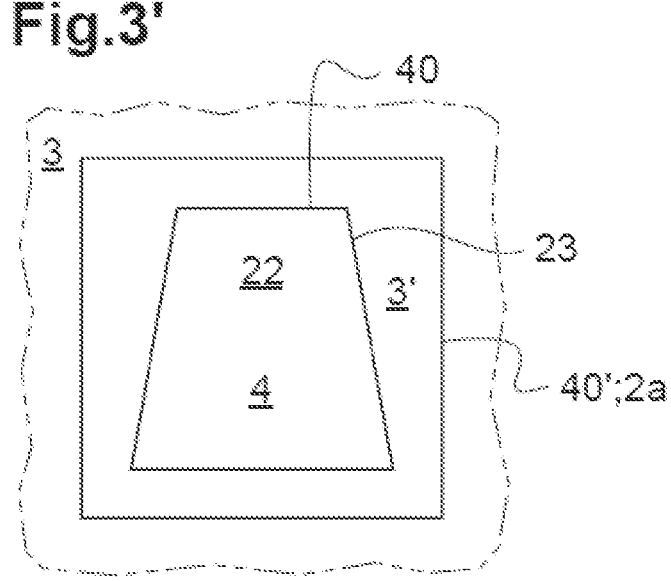

(51) Int. Cl.
*B32B 7/12* (2006.01)
*B32B 17/10* (2006.01)
*B32B 27/08* (2006.01)
*B32B 27/30* (2006.01)
*B32B 27/36* (2006.01)

(52) U.S. Cl.
CPC ........ *B32B 17/10036* (2013.01); *B32B 27/08* (2013.01); *B32B 27/30* (2013.01); *B32B 27/36* (2013.01); *B32B 2255/10* (2013.01); *B32B 2255/26* (2013.01); *B32B 2255/28* (2013.01); *B32B 2307/412* (2013.01); *B32B 2307/42* (2013.01)

(56) References Cited

U.S. PATENT DOCUMENTS

| | | |
|---|---|---|
| 10,373,731 B1 | 8/2019 | Wilson et al. |
| 2004/0258929 A1 | 12/2004 | Glaubitt et al. |
| 2019/0039353 A1 | 2/2019 | Bureloux et al. |
| 2019/0337269 A1* | 11/2019 | Sartenaer ................. E06B 3/66 |
| 2020/0398646 A1* | 12/2020 | Mujcinovic ....... B32B 17/10761 |

FOREIGN PATENT DOCUMENTS

| | | |
|---|---|---|
| EP | 1 329 433 A1 | 7/2003 |
| WO | WO 93/07329 A1 | 4/1993 |
| WO | WO 2004/025334 A2 | 3/2004 |
| WO | WO 2005/049757 A1 | 6/2005 |
| WO | WO 2008/059170 A2 | 5/2008 |
| WO | WO 2018/015312 A1 | 1/2018 |
| WO | WO 2018/142078 A1 | 8/2018 |
| WO | WO 2018/178286 A1 | 10/2018 |
| WO | WO 2018/178883 A1 | 10/2018 |
| WO | WO 2020/214431 A1 | 10/2020 |
| WO | WO 2020/221597 A1 | 11/2020 |
| WO | WO 2021/043838 A1 | 3/2021 |

OTHER PUBLICATIONS

"Ultra-Thin SCHOTT AS 87 eco Aluminosilicate Glass," Nov. 2020, Retrieved from the Internet: URL:https://abrisatechnologies.com/wp-content/uploads/2017/05/Ultra-Thin-SCHOTT-AS-87-eco-Aluminosilicate-Glass.pdf, XP055752220, 2 pages.

"Trosifol®—World of Interlayers: Special PVB film admits ultra-violet light unfiltered," Apr. 2013, XP055751446, Retrieved from the Internet: URL:https://www.trosifol.com/news/detail-view/news/special-pvb-film-admits-ultraviolet-light-unfiltered/, [Retrieved on Nov. 17, 2020], 2 pages.

* cited by examiner

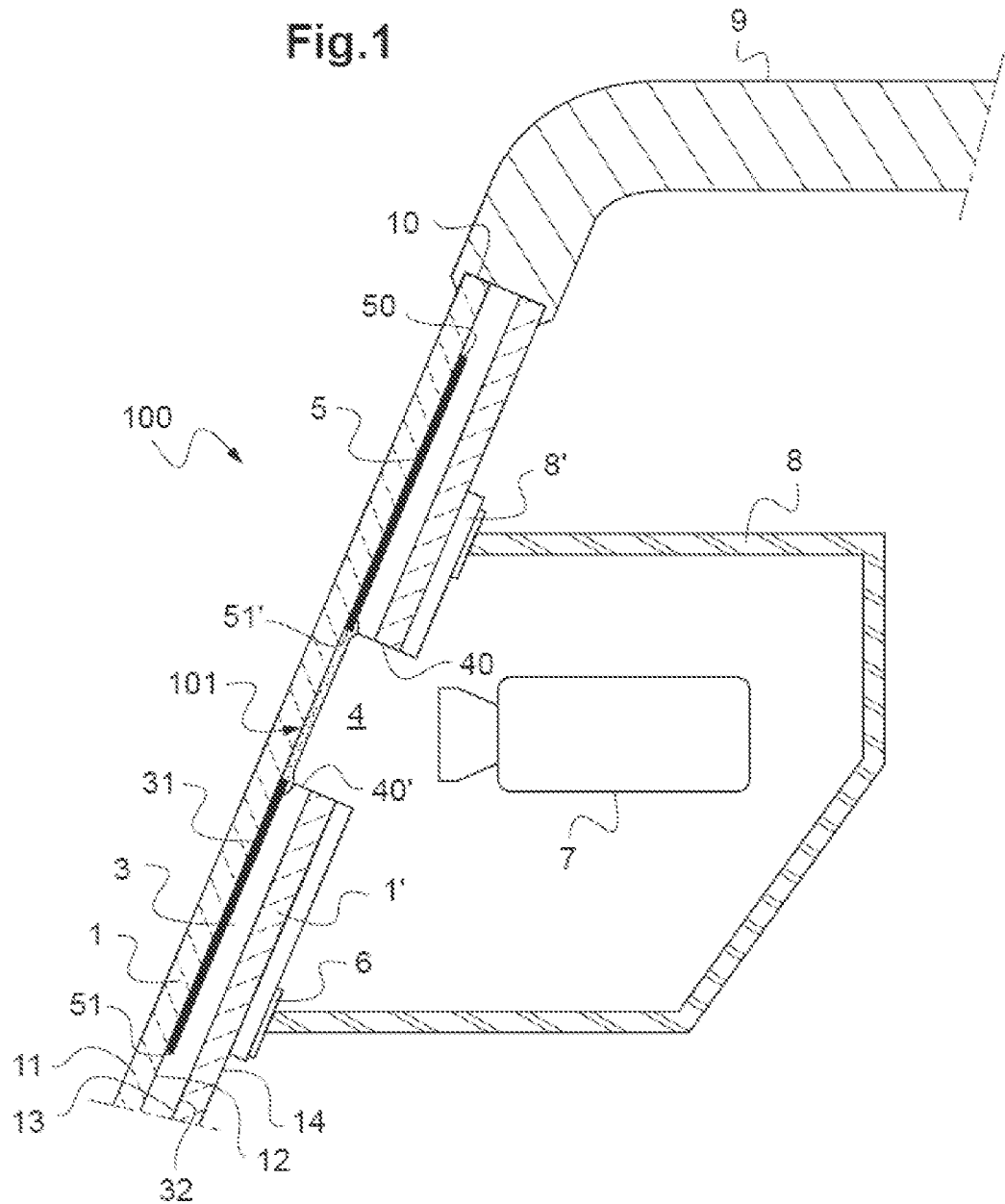

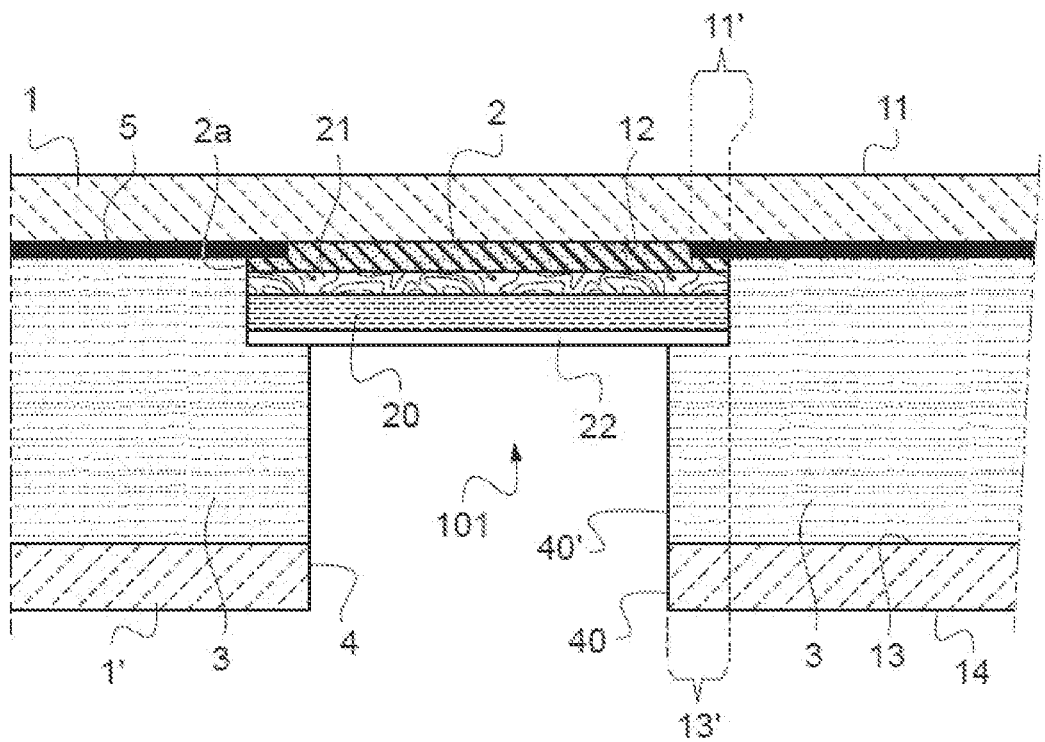
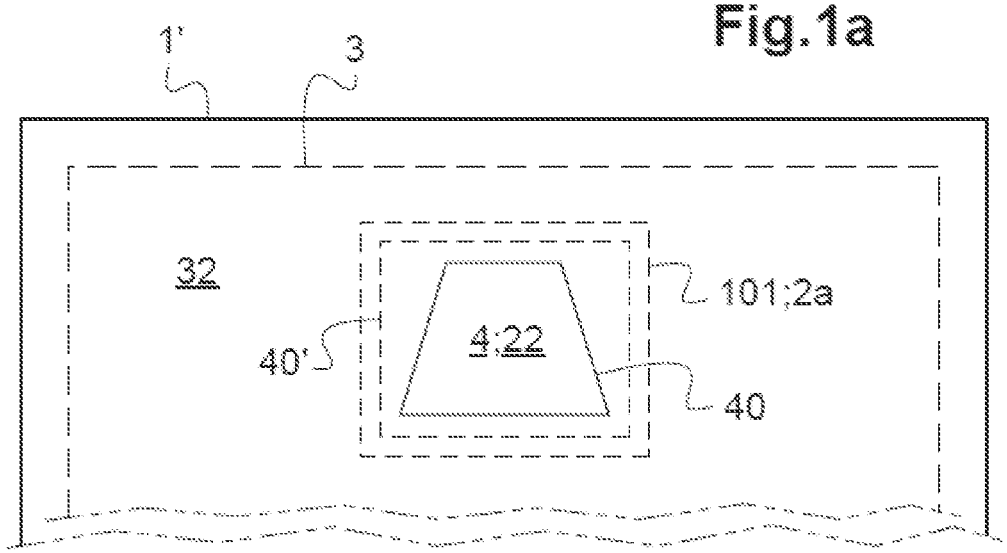

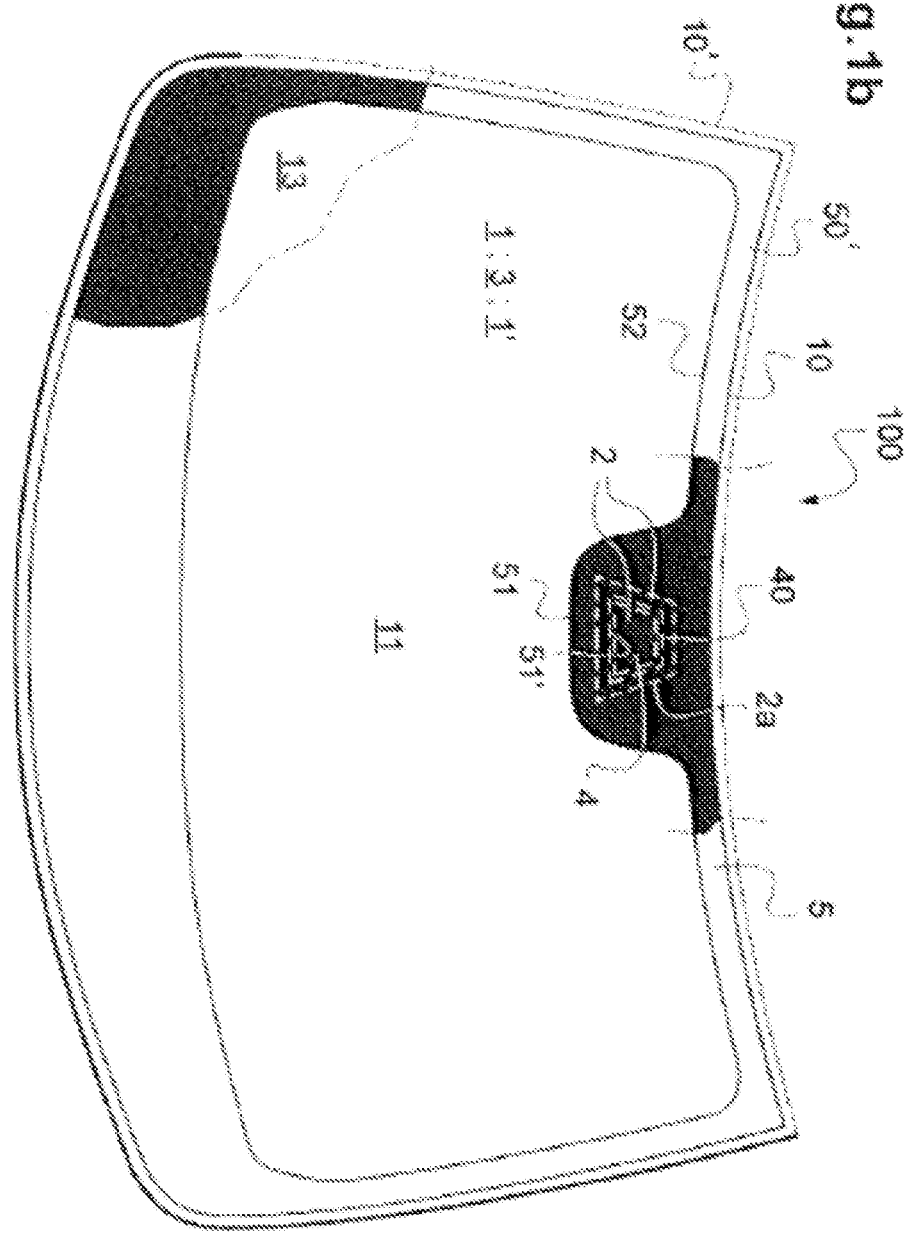

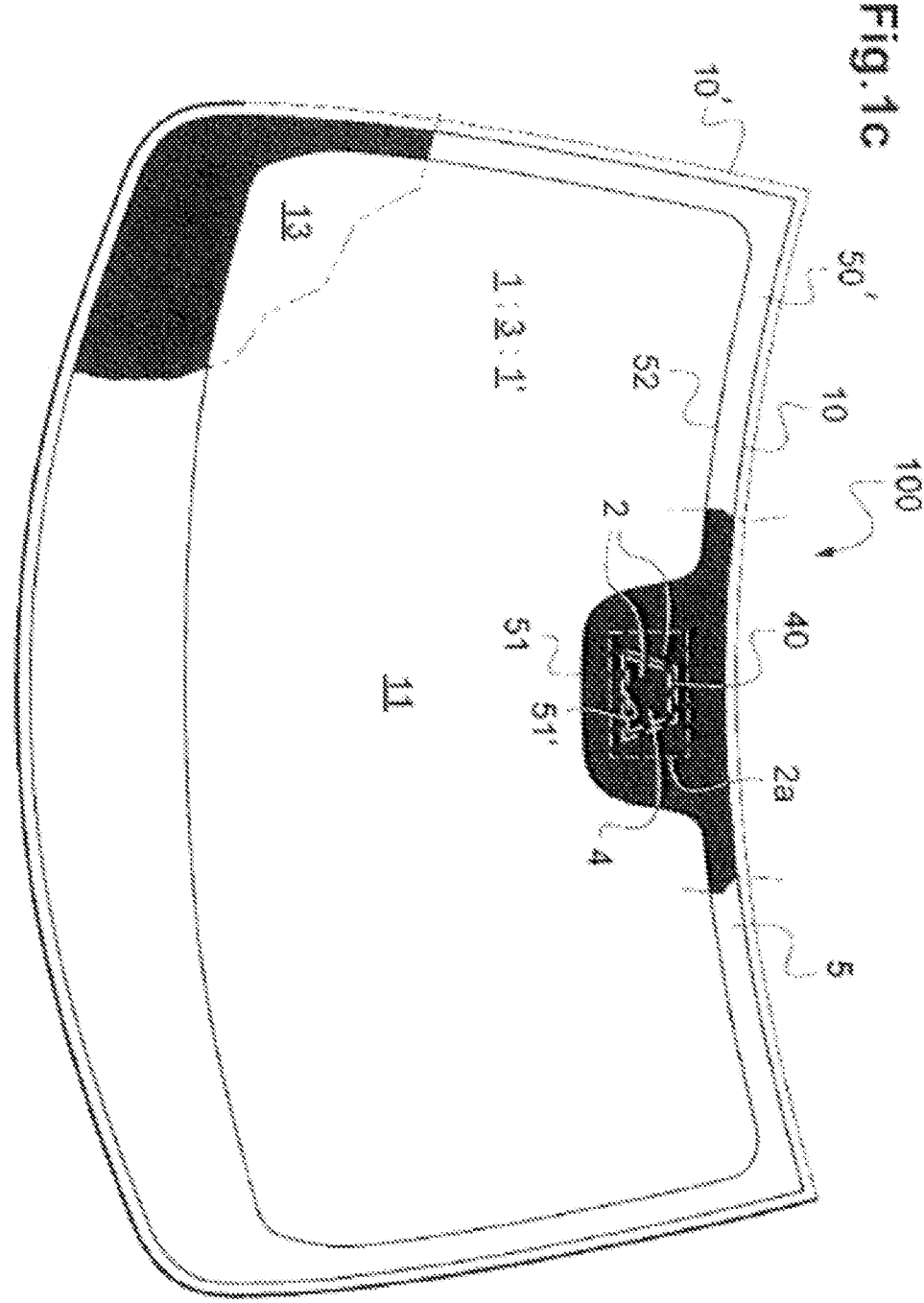

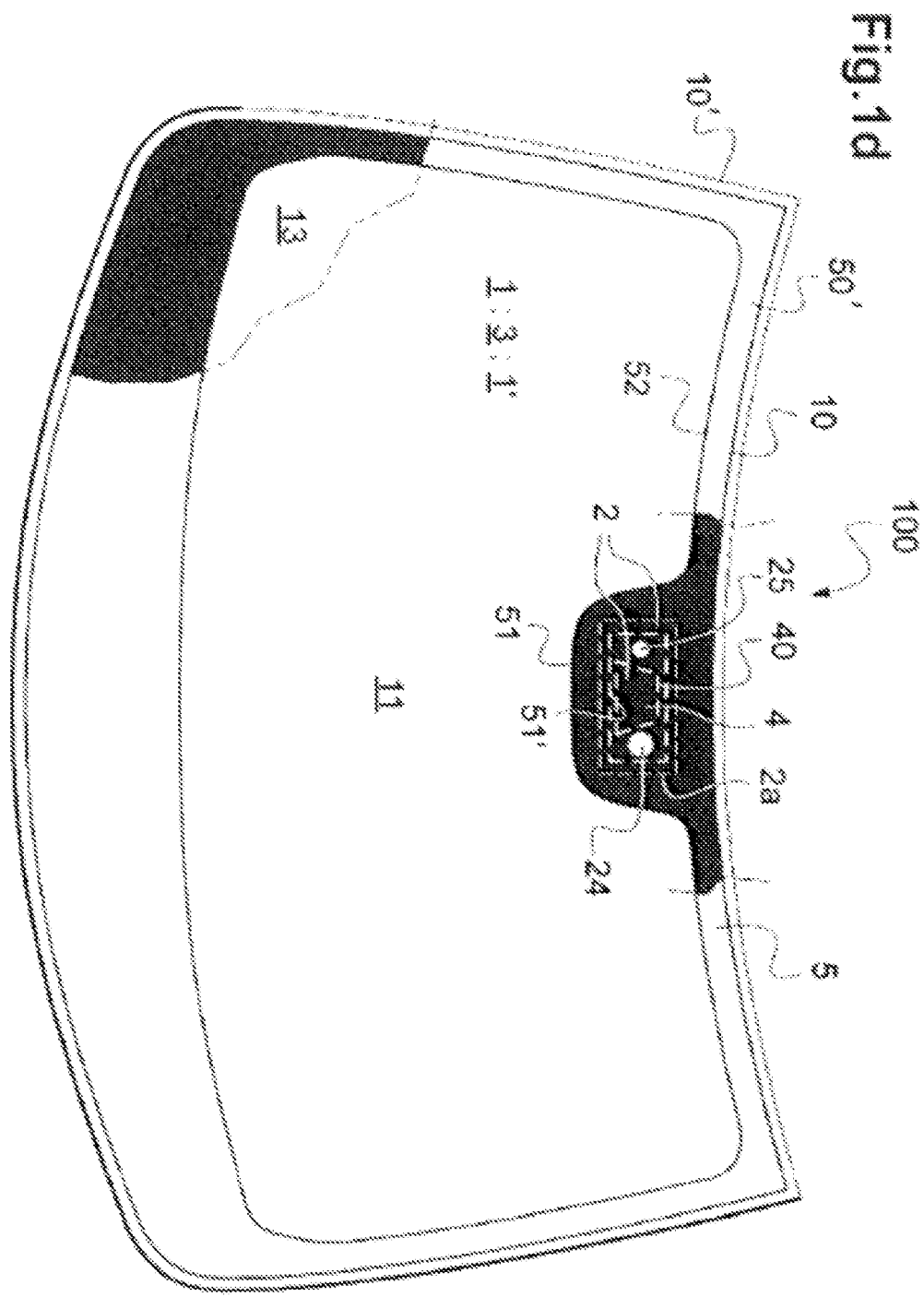

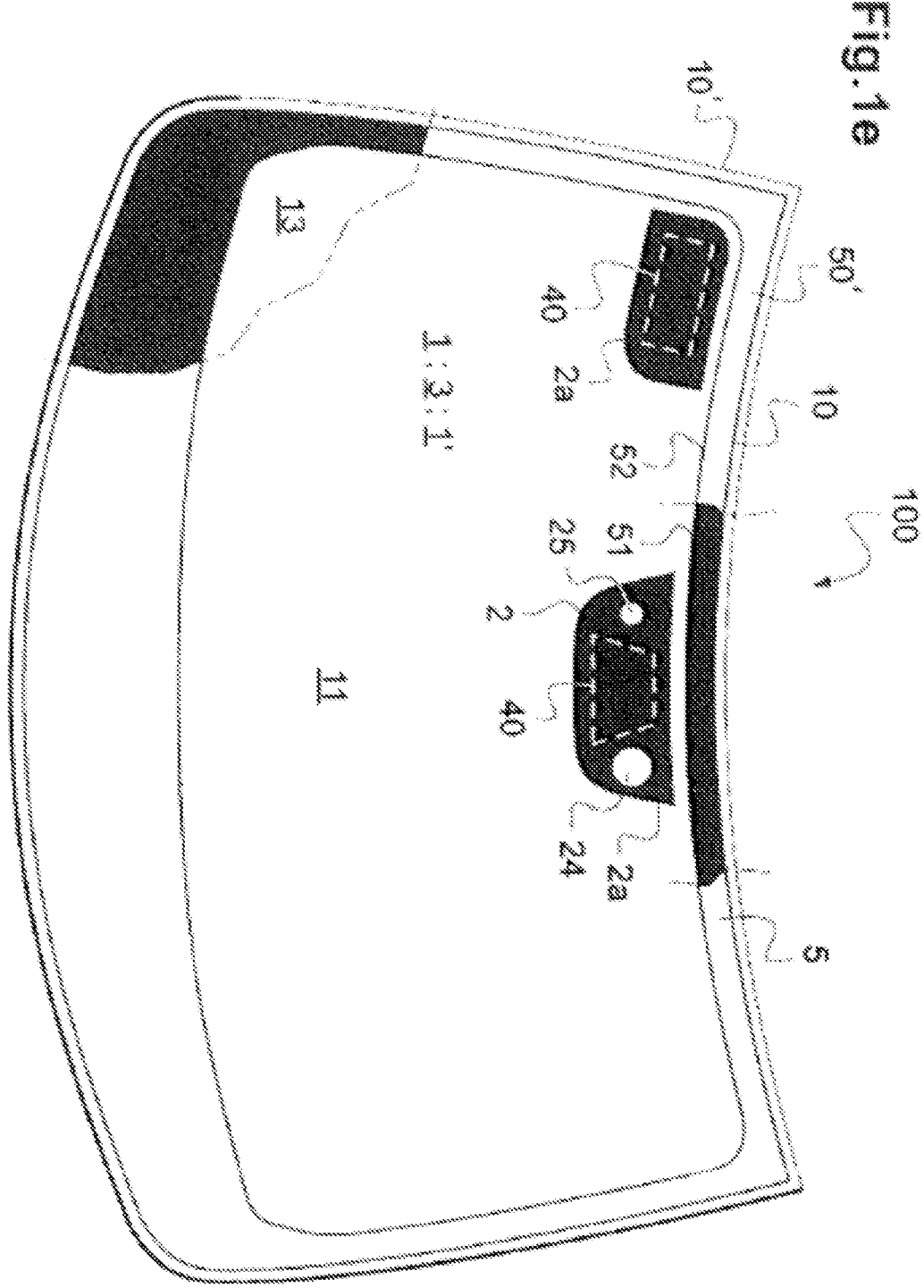

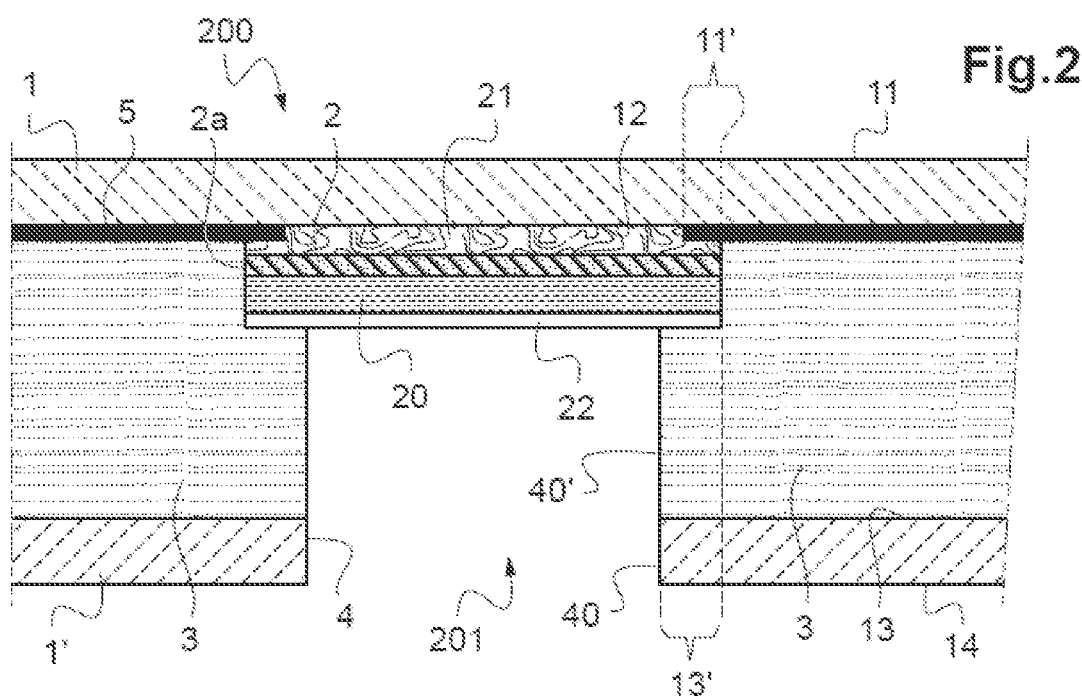

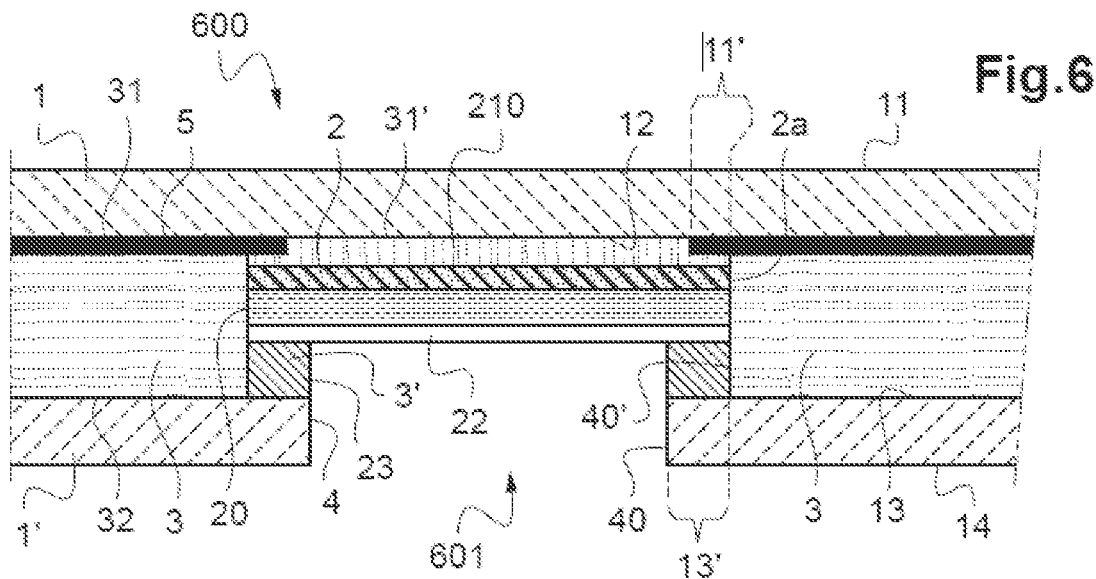
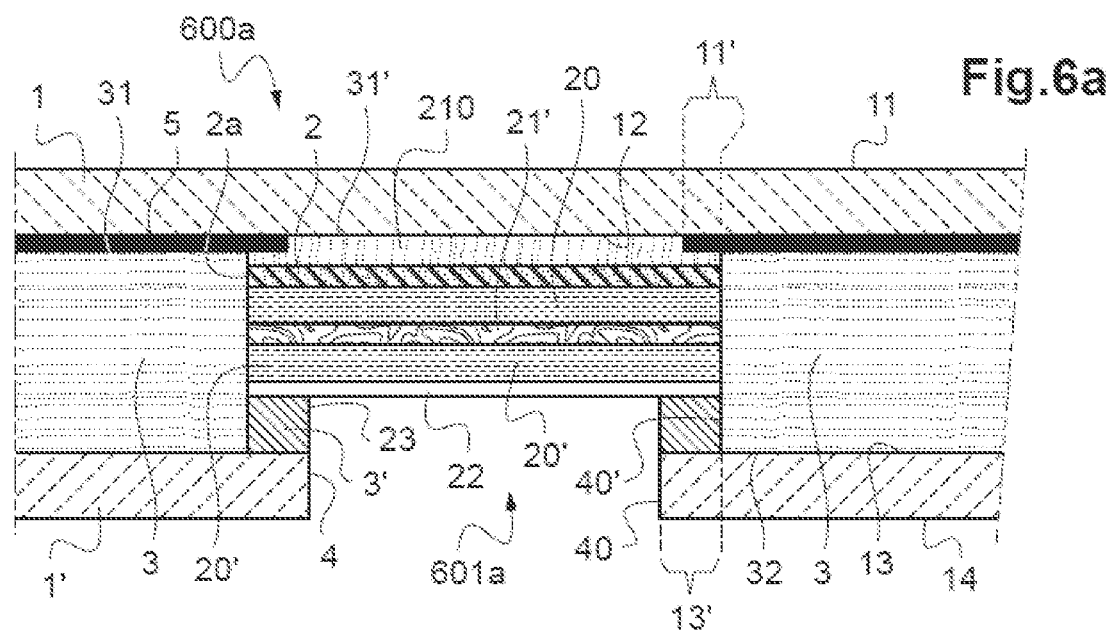

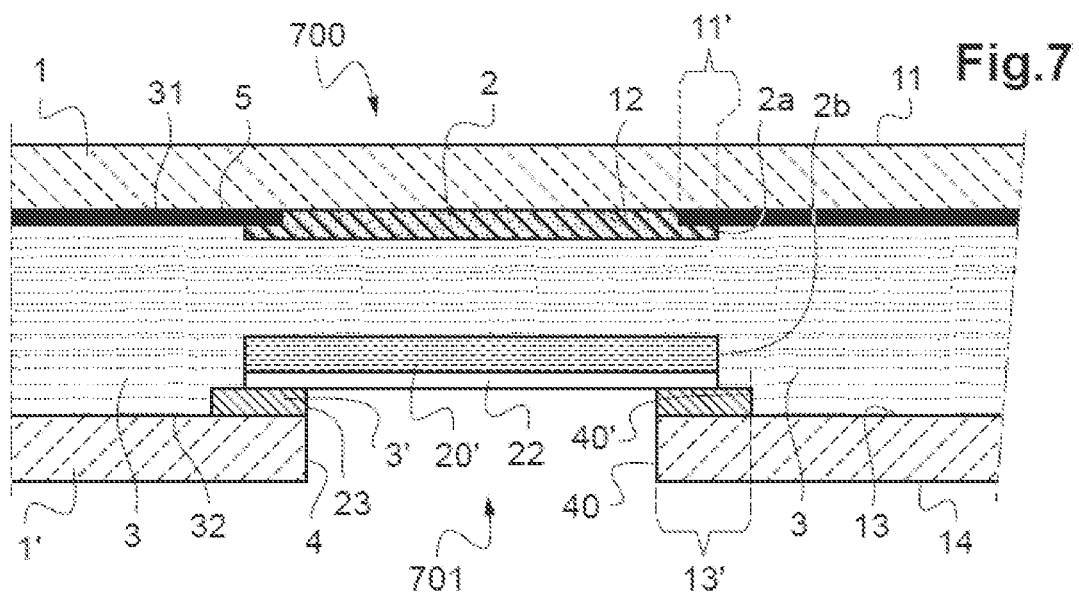
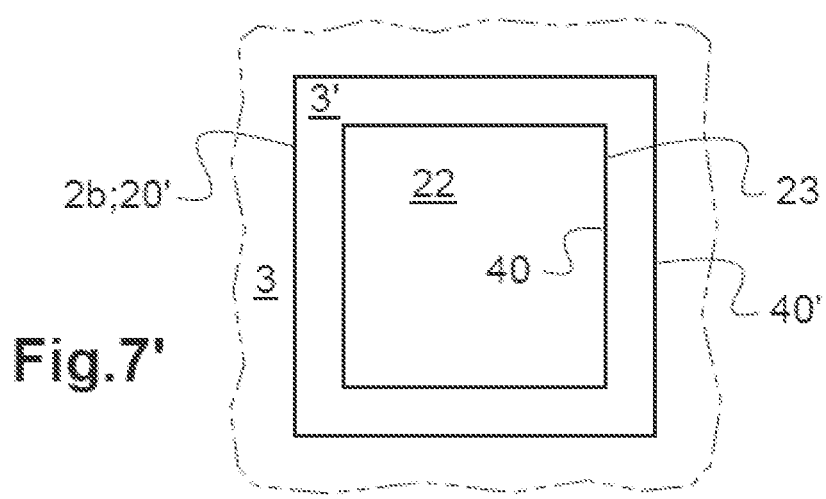

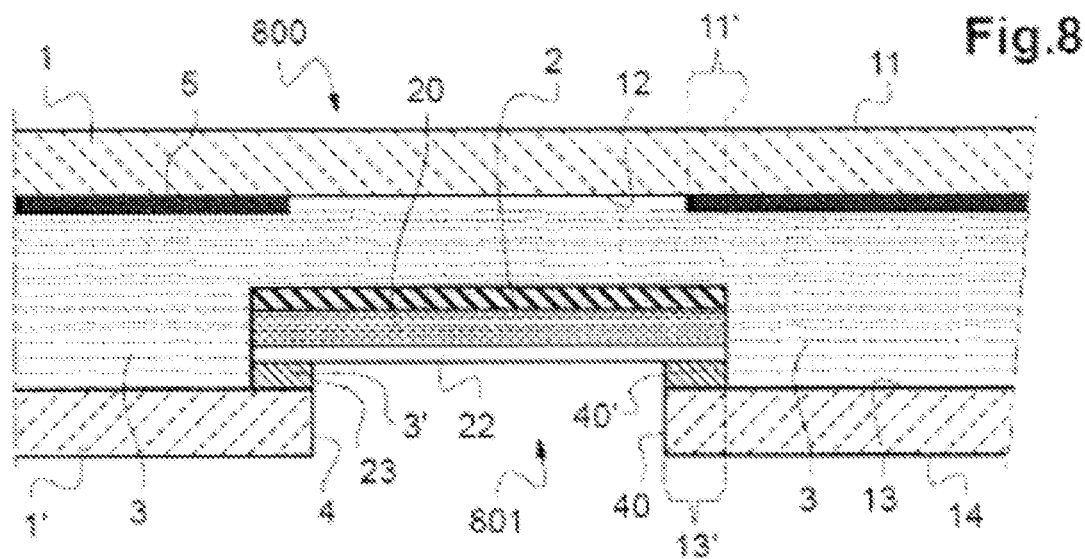
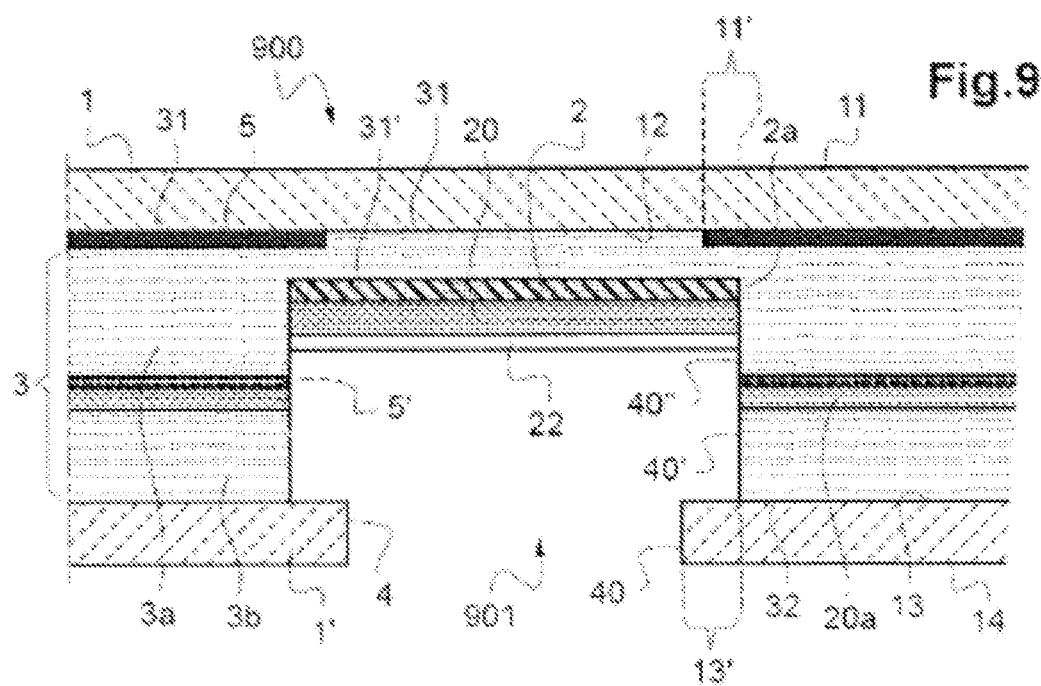

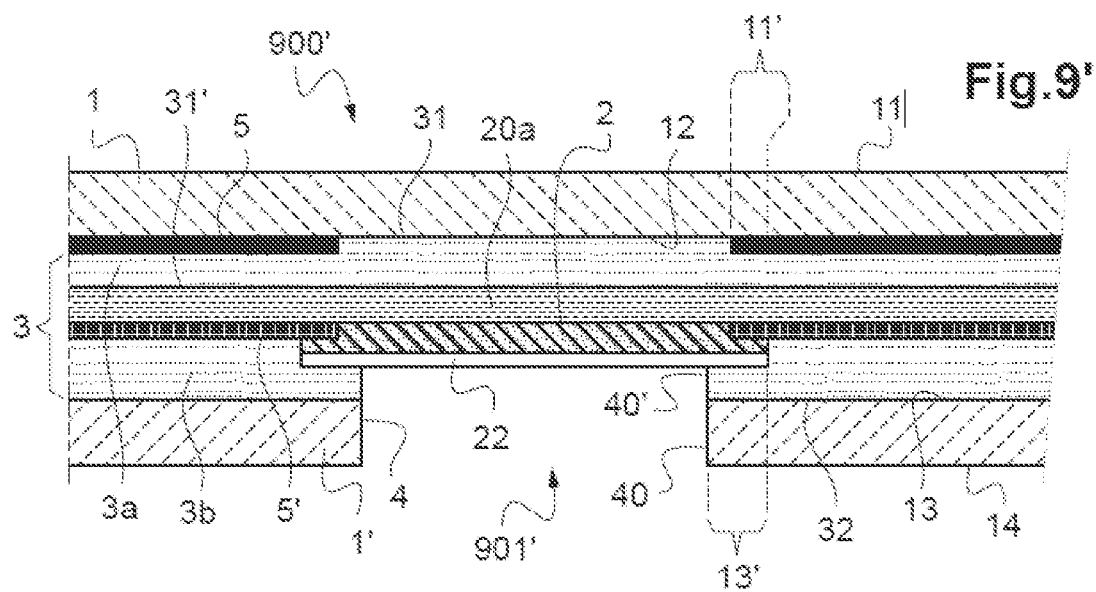

LAMINATED VEHICLE GLAZING, ASSOCIATED DEVICE HAVING A NEAR-INFRARED VISION SYSTEM, AND PRODUCTION THEREOF

CROSS-REFERENCE TO RELATED APPLICATIONS

This application is the U.S. National Stage of PCT/FR2020/052614, filed Dec. 23, 2020, which in turn claims priority to French patent application number 2000022 filed Jan. 3, 2020. The content of these applications are incorporated herein by reference in their entireties.

The invention relates to a laminated glazing, in particular a windshield, in a vehicle, in particular a road vehicle or a train, in association with a system for viewing in the near infrared region. The invention also describes a device combining said glazing and the near infrared viewing system and also the process for the manufacture of the laminated glazing.

Glazings for autonomous vehicles and the associated technology are constantly evolving, in particular in order to improve safety.

Remote sensing by laser or LIDAR, an acronym for the expression "light detection and ranging" or "laser detection and ranging", is used in vehicles at the headlights or the roof.

More recently, the patent application WO20180153012 proposes to place a LIDAR operating in the near infrared region between 750 nm and 1050 nm behind the laminated windshield comprising two sheets of extraclear glass and an infrared filter, removed from the zone viewed by the LIDAR.

The performance qualities of this device (glazing associated with LIDAR) can be improved.

More specifically, the present invention relates to a laminated (and preferably bent) glazing for a vehicle, in particular a road vehicle (car, truck, public transport: bus, coach, and the like) or rail vehicle (especially having a maximum speed of at most 90 km/h or of at most 70 km/h, in particular subways or tramways), especially a windshield, or also a back window, indeed even a side window, of given thickness E1, for example subcentimetric thickness, in particular of at most 5 mm for a road vehicle windshield, in particular car windshield, which glazing comprises:
  a first glass sheet, which is in particular bent, intended to be the exterior glazing, with a first external main face F1 and a second internal main face F2 (oriented toward the passenger compartment), if a motor vehicle with a thickness preferably of at most 4 mm, and even of at most 3 mm or 2.5 mm—in particular 2.1 mm, 1.9 mm, 1.8 mm, 1.6 mm and 1.4 mm—and preferably of at least 0.7 mm or 1 mm
  a lamination interlayer (single fine sheet or plurality of fine sheets), optionally neutral, clear, extraclear or tinted, in particular gray or green, made of polymer material, preferably thermoplastic polymer material, and better still made of polyvinyl butyral (PVB), preferably, if a road vehicle, with a thickness E3 of at most 1.8 mm, better still of at most 1.2 mm and even of at most 0.9 mm (and better still of at least 0.3 mm and even of at least 0.6 mm), the lamination interlayer being optionally acoustic and/or having optionally a cross section decreasing in wedge shape from the top to the bottom of the laminated glazing (especially a windshield), in particular for a head-up display (HUD), a lamination interlayer with a main face FA oriented toward F2 and with a main face FB opposite to FA
  a second glass or plastic sheet intended to be the interior glazing, which is preferably bent and in particular tinted, with a third main face F3 on the F2 side and a fourth internal main face F4 (oriented toward the passenger compartment), if a road vehicle with a thickness E2 preferably less than that of the first glazing, in the case of the glass even of at most 3 mm or 2 mm—in particular 1.9 mm, 1.8 mm, 1.6 mm and 1.4 mm—or even of at most 1.3 mm, and preferably of at least 0.7 mm, the thickness of the first and second sheets being preferably strictly less than 5 or 4 mm, even than 3.7 mm.

According to the invention, the first glass sheet exhibits a content by weight of total iron oxide of at most 0.05%.

In particular, the second glass or plastic sheet is capable of absorbing (significantly) in the near infrared region; for example, the second sheet is made of glass and exhibits a content by weight of total iron oxide of at least 0.4%.

Consequently, the second (glass or plastic) sheet exhibits a traversing hole in the thickness, in particular with a width W1 which is at least centimetric and preferably of at most 25 cm or better still of at most 15 cm, even better still of at most 5 cm, for a better mechanical strength, in particular of trapezoidal or rectangular, or circular, section.

Optionally, the (colorless, and the like) lamination interlayer exhibits a partial or traversing hole in the thickness preferably at least extending the traversing hole of the second sheet, which is optionally broader, in particular by at most 10 mm, or narrower by at most 3 mm or 1 mm, in particular of trapezoidal or rectangular or circular and the like section (in particular of the same shape and same proportionality as the section of the traversing hole of the glass).

The glazing according to the invention exhibits, under said traversing hole of the second sheet, preferably on the side of the face F2, a selective filter which absorbs in the visible region and which is transparent at at least one "working" wavelength in the infrared region in a range extending from 800 nm to 1800 nm, in particular 905±5 nm and/or 1550±5 nm and/or also 850±5 nm.

Opposite said traversing hole, the laminated glazing (at least the combination comprising the first glass sheet, the optional lamination interlayer and the selective filter) exhibits:
  a total transmission of at least 80.0%, 90.0% or 95.0%, at the working wavelength, preferably measured at 90° or even preferably also at 60° or even as far as 60°, with respect to the (local) plane of the first sheet, for example on the face F2 (passenger compartment) side and/or on the face F1 side
  a total transmission of at most 10.0%, 5.0% or 1.0% or 0.5% in the visible region (in particular at least at a reference value of 550 nm+−50 nm or in a range extending from 500 to 600 nm or between 400 and 700 nm) measured at 90° or even preferably also at 60° or even as far as 60°, on the face F1 side, better still at least in a range extending from 500 to 600 nm or between 400 and 700 nm, even throughout the range of the visible region between 390 nm and 750 nm, in particular 0.5% over 390-750 nm, and 0.1% over 390-600 nm, especially the selective filter masking (significantly) the traversing hole viewed from the face F1.

Preferably, the selective filter is bonded (adhesively bonded, in adhesive contact) to the face F2 (front bonding) or to the face F3 (rear bonding) or both, instead of flattened against the face F2 and/or against the face F3.

Thus, according to the invention, in order to achieve a high level of transmission, the following are selected:
1) an exterior glass extraclear in the targeted near infrared region,
2) an interior glass more absorbent in the targeted near infrared region and necessarily hollowed out.

This solution is more effective than that of the prior art based on two entire extraclear glasses.

In addition, by avoiding the use of a second extraclear glass, it improves comfort (heat in the vehicle) and the esthetics and is more economical.

The shape and the dimensions of the traversing hole are configured according to the techniques of the art so as to efficiently and selectively transmit and collect all of the radiation passing through the glazing (windshield, back window, and the like).

For example, the hole is of the same shape as the infrared viewing system, such as LIDAR.

The hole (open or closed) can in particular be of convex cross section, especially preferably trapezoidal cross section, or also circular or oval or elliptical or even rectangular, square, and the like, cross section.

The hole has in particular a dimension defined by the field of view of the LIDAR as a function of its positioning.

The traversing hole of the second sheet (of glass or plastic) can be free or occupied in all or part, for example by a filling material which is transparent at the working wavelength, and/or occupied by insertion of a portion of the LIDAR.

The traversing hole can be:
closed hole (surrounded by the wall of the second glass or plastic sheet), thus within the glazing, in particular spaced from the closest edge face of the glazing by at least 3 cm or 5 cm
open or emerging, forming a notch (peripheral).

The glazing can comprise a total traversing hole composed:
of a traversing hole in the lamination interlayer (single fine sheet or plurality of fine sheets) of width D1
and of said traversing hole in the second glass or plastic sheet of width W1.

The first and second holes have the same or similar axes of symmetry and preferably have identical widths (before and/or after laminating).

The traversing hole is intended to be positioned in the optical path of the infrared viewing system.

The selective filter serves to conceal the infrared viewing system at said working wavelength, such as a LIDAR, from the outside of the vehicle without damaging the excellent transmission at the working wavelength.

The invention is very particularly suitable for glazings (windshield, back window, and the like) in autonomous or semiautonomous vehicles: level L2+, L3, L4 and L5 (full autonomous, thus autonomous), as well as vehicles of the Robot Taxi and Shuttle type, and the like.

Iron oxide, present as an impurity in the majority of natural raw materials used in glassmaking (sand, feldspar, limestone, dolomite, and the like), absorbs both in the visible and near ultraviolet region (absorption due to the ferric $Fe^{3+}$ ion) and especially in the visible and near infrared region (absorption due to the ferrous $Fe^{2+}$ ion); this is why the iron oxide is reduced in the first glass sheet.

In the second glass sheet (if made of glass), it is thus possible to choose a higher content of iron oxide.

The angle of the glazing, in particular a road vehicle windshield, can typically be between 21° and 36°, with respect to the ground, and on average 30°. Consequently, a high transmission at 60° is particularly advantageous because this is the angle of incidence of the beam of the LIDAR on the windshield if the latter is at 30° from the ground.

The transmission in the infrared region is measured, for example, with a Fourier spectrometer, such as the BrukerVertex-70.

In order to quantify the transmission of the glass in the visible region, there is often defined a light transmission factor, called light transmission, often abbreviated to "$T_L$", calculated between 380 and 780 nm and brought back to a glass thickness of 3.2 mm or 4 mm, according to the standard ISO 9050:2003, thus taking into consideration the illuminant D65, as defined by the standard ISO/CIE 10526, and the C.I.E. 1931 standard colorimetric observer, as defined by the standard ISO/CIE 10527.

Naturally, the light transmission $T_L$ of the laminated glazing in a zone without a hole (central zone of the windshield) is preferably at least 70% or 75%, 80% or 85% or 88%.

Said selective filter is, for example, local with a given surface area SO and the orthogonal projection of the surface area SO onto the second sheet encompasses at least the section Sc of the traversing hole.

The selective filter is, for example, an entire layer, indeed even with discontinuities for example forming a (micro- or nano)mesh.

The selective filter can be of any nature: coating (ink, varnish, and the like), flexible film; it can be located at said traversing hole or more extendedly, for example in order to conceal one or other sensors, as described in detail later.

The selective filter is (mainly) in a zone with a single glass sheet.

The incorporation of the selective filter under the hole, in particular its adhesive bonding, will be described in detail below in order to avoid the creation of optical defects (distortion, and the like), in particular by puckering, delamination or appearance of bubbles or to facilitate its precise positioning or the speed of its installation industrially.

For a selective filter involving a polymer film, it is preferred for it to be in adhesive contact with the face F2 or with the lamination interlayer.

The traversing hole is preferably closed (in contrast to emerging as a cavity made in the edge face of the second sheet), in particular spaced from the edge face of the second sheet by at least 2 cm/5 cm/10 cm or even more.

The selective filter can overstep beyond the traversing hole, for example by at most 50 mm or better still by at most 20 mm, between the face F2 and the face F3 in a (glass) zone, "border" zone, of said hole and have a different shape for the filter and the traversing hole, for example.

The filter will conceal the hole and the LIDAR but it may also be desired to cover a zone devoid of opaque masking layer (absorbing at the working wavelength), for example a gap in this layer, or also a zone which is contiguous or in the vicinity.

The filter can thus mask in particular a zone, "camera" zone, provided with sensor(s), in particular a camera in the visible region or in the far infrared region (thermal camera).

However, in order to do this, the selective filter exhibits a gap (closed or emerging) in the zone provided for allowing the passage of the light rays resulting from the scene to be captured by the visible or thermal camera.

The selective filter can have a closed outline, surrounding the hole (present over the entire circumference of the closed hole), for example with a shape similar or proportional to the hole. The selective filter can also be a simple geometric shape (rectangle, and the like) in which the closed hole is framed.

The traversing hole with the constant or variable section Sc, in particular trapezoidal or rectangular or as a disc or oval, has, for example, a smaller dimension (diameter) of at least 2 cm, 3 cm, 5 cm and preferably a greater dimension of at most 30 cm or 25 cm. In said traversing hole, there may be an insert, preferably with a width of at most 1 cm, in particular made of polymer material. The insert is mounted at least on the wall of the second glass or plastic sheet delimiting the hole. This insert will also be concealed by the selective filter.

In order not to identify the LIDAR zone, the selective filter preferably does not form a (substantially) opaque isolated zone (visible, identifiable from the face F1), adjacent to a transparent zone of the laminated glazing over all or part of its circumference. The selective filter can thus:
- be incorporated in a masking/decorative zone (like that normal at the periphery of the glazing) provided with a (emerging or closed) gap,
- be adjacent to this masking zone,
- and/or extend to form all or part of this decorative zone.

Advantageously:
- the selective filter extends beyond said traversing hole, from the outside extends a masking layer or masks a gap in a peripheral masking layer,
- the selective filter extends beyond said traversing hole, in particular from the outside extends a masking layer or masks a gap in a peripheral masking layer, the selective filter exhibits at least one local opening or discontinuity to allow the passage of the light rays, in particular for at least one additional sensor, especially sensor of a visible camera or thermal camera, especially camera fixed to a plate on face F4 holed in order to allow the passage of said light or electromagnetic rays (thermal camera).

The selective filter is defined by an L*1, a*1, b*1, defined in the L*a*b* CIE 1976 chromatic space. The masking layer of color C1 also is defined by an L*2, a*2, b*2 with a colorimetric difference ΔE* given by the following formula:

$$\Delta E^* = \sqrt{(\Delta L^{*2} + \Delta a^{*2} + \Delta b^{*2})}.$$

Preferably ΔE*<4, better still ΔE*<2 (the human eye detects with difficulty), better still ΔE*<1 (the human eye does not detect).

Also advantageously, the selective filter is peripheral with a surface S, the glazing preferably comprises a peripheral opaque masking layer absorbing more near infrared than the selective filter with a surface S' which is in the vicinity or in the region of said traversing hole and S' then exhibiting a gap in line with said traversing hole, the projection of S (masking layer offset from said traversing hole) or S+S' (masking layer with gap) on the face F1 is an, in particular black, peripheral opaque masking zone, in particular a band.

The opaque masking layer is in particular in the form of at least one coating on one of the first and second sheets and/or on the lamination interlayer.

This zone is, for example, a rectangular band along an edge of the glazing, in particular longitudinal edge, especially of a windshield. The band is in particular a strip under the entire length of the edge and widened in the zone (in particular central zone) with said traversing hole and the selective filter hiding it.

The masking layer can be on either side of the (closed) hole and even surround the (closed) hole.

The gap can have an open or closed outline, surrounding the hole, for example with a shape similar or proportional to the hole.

The selective filter can thus extend beyond the traversing hole.

In a first configuration, it extends (widely) beyond into a border zone of the hole (thus under the second glass sheet) to form, by itself alone, a masking element, in particular a peripheral masking band and preferably along a longitudinal edge of the glazing, in particular longitudinal edge of a windshield, indeed even a masking frame.

In this case, the selective filter has a double functionality and can replace all or part of the opaque enamel (on face F2 and/or F3 and/or F4) or the ink printed on the lamination interlayer conventionally used.

In a second configuration, the selective filter remains local, extends beyond the hole by at most 50 mm, the glazing additionally comprising the opaque masking layer, in the form of at least one coating on one at least of the first and second sheets and/or on the lamination interlayer rather than a bulk-tinted element.

The masking layer and the selective filter are optionally in planes which are separate and outside the traversing hole:
- they are contiguous in the sense that their edge faces (those in the vicinity of the traversing hole) are aligned or even their main faces can in part face each other (lateral overlapping over at most 50 mm),
- or are offset (the edge faces are offset, without contiguity or overlapping) by at most 100 μm in order to maintain this visual impression of continuous opaque (black) band.

In particular, the edge face of the selective filter is spaced (laterally) by at most 100 μm from the gap in order not to experience interruption of the opacity to the naked eye and the edge face of the masking layer forming the edge of the gap is spaced (laterally) by at most 500 μm from the wall of the traversing hole if it is desired to limit the extent of the selective filter.

In the specific case where the masking layer is an ink deposited (printed) on the lamination interlayer (PVB), it may be preferred for the ink to be spaced from the edge of said traversing hole by at least 1 cm in order to prevent delamination.

It may be preferred for the masking layer, such as an enamel, to be deposited on face F2 only rather than on the second sheet with a traversing hole.

In the case of a hole produced before deposition of the masking layer on glass on face F2 (enamel screen printing), the alignment at the hole can complicate the stages of adjusting the process at the start of production. The stresses generated during the prebaking of the enamel (in particular during the cooling), combined with the defects generated by the creation of the hole, can cause breakages at this stage.

In the case of a hole produced after screen printing on glass on face F3 or F4, the presence of the enamel weakens the glass, which can complicate the production of the hole.

In both cases, it is preferable for the masking layer on glass (such as enamel) to be placed more toward the outside than the other layers for esthetic reasons (more pleasant edge than the edge of the other layers).

Thus, in one implementation, the glazing according to the invention comprises an opaque masking layer in the form of at least one coating on one at least of the first and second sheets and/or on the lamination interlayer; peripheral masking layer and in the region of said traversing hole, the masking layer exhibiting a gap in line with said traversing hole and even optionally along the edge of the traversing hole, the selective filter being opposite the opaque masking layer, in particular with an overlap over at most 50 mm, 20 mm, 10 mm, or contiguous (the edges are joined end to end in projection onto F1) or is offset by at most 0.5 μm or by at most 150 μm.

In particular (outside said traversing hole, in the border zone), the selective filter is in contact with the masking layer and even the selective filter is a coating on the masking layer, indeed even under the masking layer.

It is possible to provide one of the following arrangements.

Especially, the masking layer is on the face F2, the selective filter is spaced from and above the masking layer on the face F2 or is in contact with the masking layer, in particular forms a coating on the masking layer, in particular overlapping over at most 50 mm.

Especially, the selective filter is a coating on the face F2 and is overlapped by the masking layer, in particular overlapping over at most 50 mm.

Especially, the selective filter is a coating on the face F2 and the masking layer is on one of the faces FA or FB, in particular overlapping over at most 50 mm.

Especially, the selective filter is a coating on the face FA or FB and is overlapped by the masking layer, for example an ink, in particular overlapping over at most 50 mm.

Especially, the selective filter is a coating on one of the faces FA or FB and the masking layer is on the other of the faces FA or FB, in particular overlapping over at most 50 mm.

Especially, the selective filter is a coating on one of the faces F2, FA or FB and the masking layer is on the face F3 or F4, in particular overlapping (in projection) over at most 50 mm.

The opaque masking layer is preferably a continuous layer (flat tint with a solid edge or alternatively a graduated edge (set of patterns)).

The masking layer can be at 2 mm or 3 mm (less than 5 mm) from the edge face of the glazing.

The masking layer can be a strip framing the glazing (windshield, and the like), in particular made of black enamel. A gap is thus created in this masking layer.

Another masking layer can be on face F3 or F4.

In the border zone of the traversing hole, the face F3, bare or coated with a functional coating, for example of at most 100 μm, 1 μm: solar control, heating, electrode, and the like, layer), is in adhesive contact with:
  a) the face FB of the PVB-based lamination interlayer,
  b) or an additional band, "rear band", (preferably with a width of at least 10, 20 mm, over the circumference if the traversing hole is closed), thermoplastic PVB-based rear band, rear band in contact with/joining the lamination interlayer partially or completely holed in line with the traversing hole with a hole in the PVB broader than said traversing hole by at least 10, 20 mm.

The face FB of the lamination interlayer can be partially or completely holed in thickness in line with the traversing hole, at the face F3, said hole being according to a given shape (for example trapezoidal) and being framed in a rectangle, with a hole in the lamination interlayer (PVB)
  which is broader than said traversing hole (PVB set back),
  which is equal to the traversing hole,
  which is less than said traversing hole by at most 5 mm, 3 mm, 1 mm.

The selective filter is between the face F2 and the face F3.

Under said hole, the selective filter can comprise a (flexible) polymeric film with a thickness which is submillimetric (to prevent excess thickness) and even of at most 0.5 mm, 0.3 mm or 0.15 mm against the face F2 and bonded to the face F2 in the border zone of said hole.

However, to avoid any risk of optical distortions (presence of bubbles, and the like), it is preferred for, in the zone of said traversing hole, the selective filter to be bonded to the face F2:
  either the selective filter comprises an abovementioned polymeric film which is adhesively bonded (for example a film, such as a PET, which does not adhesively bond to the glass even after laminating) or in adhesive contact with the face F2 (for example a material, such as PVB, which adhesively bonds to the glass after laminating),
  or the selective filter is a coating on the face F2.

The face F2 opposite the zone of said traversing hole and preferably in a border zone of said traversing hole can comprise at least one polymer film comprising at least two functions, at least preferably by at least one functional coating, chosen from the following: selective filter, heating, antireflective, breakage-prevention.

Under said traversing hole, the selective filter is bonded to the face F2, in particular adhesively bonded or in adhesive contact with the bare face F2 or with a functional coating, thus optionally adhesively bonded to or in adhesive contact with the functional coating.

The selective filter preferably extends beyond said traversing hole into a border zone of said traversing hole and the selective filter is bonded to the bare or coated face F2 ("front" bonding) and preferably to the bare or coated face F3 ("rear" bonding).

The lamination interlayer can be used for the front bonding (selective filter under the face FA) and for the rear bonding (selective filter under the face FB).

Preferably, for mechanical protection purposes, there is:
  an adhesive contact between the lamination interlayer and the face F3 up to the edge of said traversing hole,
  or an adhesive contact between the lamination interlayer (such as PVB) and the face F3 up to close to said traversing hole, for example, spaced by at most 10 mm from said traversing hole and in the border zone of said traversing hole without the interlayer, also another adhesive contact with a plastic material, in particular a thermoplastic material, such as PVB, on the selective filter or a polymer film covering it.

And/or preferably there is:
  an adhesive contact between the lamination interlayer and the face F2 up to the edge of said hole,
  and opposite said hole an adhesive contact of the face F2 with a thermoplastic material (such as PVB) or an adhesive layer, such as PSA.

The choice of the nature and/or of the thickness of the polymer film(s) opposite said traversing hole depends in particular on the transparency at the working wavelength, on the flexibility and/or on the toughness desired.

The polymer film(s) according to the invention can fit the curvature of the first sheet, in particular be supple (flexible or semiflexible).

The polymer film(s) can in particular be based on polyester, especially a polyethylene terephthalate (PET) or polyethylene naphthalate (PEN), on polycarbonate, a polyolefin (polyethylene, polypropylene), on polyurethane, on polymethyl methacrylate (PMMA), on polyamide, on polyimide or a polyvinyl chloride (PVC), indeed even on fluoropolymer, such as ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEPs), or a polystyrene (PS). Preference is given to PET (and the interlayer made of PVB).

In particular, in one embodiment, the glazing according to the invention (in particular the selective filter) comprises a polymer, in particular PET, film with a submillimetric thickness preferably of at most 0.5 mm, 0.3 mm, 0.15 mm, polymer film opposite said traversing hole—in particular forming part of said selective filter (tinted film or support film for a coloring layer)—which comprises a front main face F'A, F2 side, and an opposite rear main face F'B, polymer film transparent at said working wavelength, polymer film which is bonded to the face F2 which is bare or with a functional coating (at least) opposite said traversing hole following one at least of the following configurations:

a) via an adhesion layer (transparent at the working wavelength) preferably which is a pressure-sensitive adhesive PSA, for example an acrylate adhesive, or a hot-melt, indeed even two-component or UV, adhesive, b) via a polymer local band, "front" band, in adhesive contact with the face F2 opposite said traversing hole, in particular with a submillimetric thickness E'3 (<E3) of at most 0.76 mm, 0.5 mm, 0.4 mm or 0.15 mm, in particular from 25 to 100 µm, 40 to 70 µm and even of at most 50 µm, the lamination interlayer, preferably based on poly(vinyl butyral), optionally being holed in line with the traversing hole, the front band is preferably in (adhesive) contact with the lamination interlayer, c) via the interlayer (opposite said traversing hole and even in the border zone of said traversing hole), preferably the interlayer being PVB (colorless, acoustic, and the like), with the FA having an optional blind hole for receiving film(s), and preferably there is a protective polymer film on the face FB.

This polymer film can be under the selective filter (on the film), cover the selective filter, which is in particular in the form of a coating on face F2 or on the film, or form part of said selective filter.

An adhesion layer (or adhesive) which is transparent at the working wavelength is preferred.

The PVB is transparent at the working wavelength.

In the case a), it may be preferred to preassemble the selective film (filter) with the (dielectric, and the like) adhesion layer which is, for example, protected by a removable film (liner) to be withdrawn before positioning between the first and second sheets. Several types of adhesives exist. Hot-melt adhesives, which have to be melted and which adhesively bond when they cure, thermosetting ones which cure when their components react or when a solvent evaporates, pressure-sensitive adhesives PSAs which adhesively bond immediately, by simple contact.

According to the invention, the PSA adhesive (on face F2, F3, between films, on interlayer, such as PVB) can, for example, have a thickness of at most 50 µm (adhesive tape type), in particular of at most 20 µm if deposited by the liquid route.

The adhesion layer can be a pressure-sensitive adhesive sheet.

The (non-adhesive) adhesion layer can, for example, be a gel, in particular a hydrogel, based on polyacrylamide, polyvinyl alcohol, polyurethane, polysaccharide, polyethylene glycol, polylactic acid or silicone.

The adhesion layer can even be a pressure-sensitive adhesive. A pressure-sensitive adhesive, abbreviated to PSA and commonly called self-adhesive, is an adhesive which forms a bond when a pressure is applied to it, so as to render the adhesive integral with the surface to be adhesively bonded. Neither solvent nor water nor heat is necessary to activate the adhesive. It is used in automobile trims and in a great variety of other products.

As its name indicates it "pressure-sensitive", the degree of bonding between a given surface and the self-adhesive binder is influenced by the amount of pressure used to apply the adhesive to the target surface. Other factors are also involved and are important for good adhesion, such as softness, surface energy and removal of contaminants.

PSAs are generally designed to form a bond and to maintain the latter at ambient temperature. A person skilled in the art will take care to choose a self-adhesive adhesive formulation suited to the conditions of its use. This is because PSAs generally experience a reduction in or disappearance of their adhesion at low temperature and experience a reduction in their ability to withstand shearing at elevated temperatures.

PSAs are generally based on an elastomer coupled with an appropriate additional adhesive agent or "tackifying" agent (for example an ester resin).

The elastomers can be based:
on acrylates, which may be sufficiently sticky not to require an additional tackifying agent,
on nitriles,
on silicone, requiring special tackifying agents, such as silicate resins of "MQ" type composed of monofunctional trimethylsilane ("M") which has reacted with quadrifunctional silicon tetrachloride ("Q"). PSAs based on silicone are, for example, polydimethylsiloxane gums and resins dispersed in xylene or a mixture of xylene and toluene,
on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers,
on vinyl ethers.

Advantageously, the pressure-sensitive adhesive is chosen from PSAs based on acrylates and PSAs based on silicone.

These adhesives are sold in the form of double-sided adhesive rolls. Mention may be made, as PSAs based on silicone, of the Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive or 7356 Adhesive.

It is thus possible to provide the following stacking configurations (forming a preassembled element preferably) directly on the face F2 (element in optional brackets):
adhesion layer, such as PSA/bulk-tinted polymer film(/adhesive such as PSA//AR film)
adhesion layer, such as PSA/bulk-tinted polymer film(/AR coating)
adhesion layer, such as PSA/polymer film with coloring coating on one at least of the main faces/adhesive (PSA, and the like)/AR film
adhesion layer, such as PSA/polymer film with coloring coating on one at least of the main faces/(/AR coating) or on the coloring layer:
adhesion layer, such as PSA/protective or heating polymer film/adhesive such as PSA/AR film.

In the case b), it may be preferred to preassemble the selective film (filter) with the front band.

In the case b), preferably, the front band is based (made of) on poly(vinyl butyral) (PVB) containing less than 15% by weight of plasticizers, preferably less than 10% by weight and better still less than 5% by weight and especially without plasticizer, in particular with a thickness of at most 0.5 mm, preferably at most 0.3 mm and better still of at most 0.15 mm, in particular from 25 to 100 μm, 40 to 70 μm and even of at most 50 μm, and the lamination interlayer is based (made of) on poly(vinyl butyral) (PVB)—with plasticizer, in particular with more than 15% by weight of conventional plasticizers—and in particular with a thickness E3 of at least 0.3 mm and better still of at least 0.5 mm.

In particular, it is possible to choose, as plasticizer-free PVB front and/or rear band, the product "Mowital LP BF" from Kuraray with the thickness which is desired.

The front band has a shape suited to covering the face of the polymer film (of the selective filter).

A double-sided adhesive tape used requires the removal of a protective film (liner).

Furthermore, the surface is sticky before the positioning and thus does not make it possible to easily readjust the film, if necessary. Moreover, liner residues may cause bubbling or haze.

The front band in the border zone under the face F3 can also overstep the overlying film(s) (one at least of these: selective filter film, AR film, safety film, heating film, and the like), in particular by at most 5 cm or 1 cm, in order to better come in contact with the PVB (during the laminating).

Under the face F3, the front band, in particular based on poly(vinyl butyral) (PVB), can be in (lateral) adhesive contact with the lamination interlayer in order to form a continuity in material (no space between interlayer and the front band).

Said front band can in particular overstep the selective filter (preferably by at most 5 cm, 1 cm) in order to ensure as much as possible the adhesive contact with the lamination interlayer.

The front band, even if made of PVB, can be made of a PVB distinct from the PVB of the interlayer and/or at the very least with a different thickness from E3, for example thinner. The front band (PVB)/interlayer (PVB) interface can be discernible.

The face F2 can comprise a stack having one at least of the following functional polymer films (of submillimetric thickness and even of at most 200 μm or 100 μm), in particular polyester, PET, which are transparent at the working wavelength: said selective filter (coating or bulk), safety film, heating film, antireflective or AR film, optionally several of said films being adhesively bonded by a PSA adhesive, film(s) bonded to the face F2 (front face or PSA, for example).

Naturally, a film can combine two or more functions by its surfaces (selective coloring coating, coating which is heating, antireflective at the working wavelength by texturing or coating, and the like) and/or bulk (bulk selective filter, bulk wire heating).

Consequently, at least one functional polymer film (of the safety element according to a) or b)) comprises at least two functions, preferably a function by at least one functional coating on said film, functions chosen in particular from the following: selective filter, heating, antireflective, breakage-prevention. For example:
film with a selective filter coating and an antireflective coating (same face or opposite faces)
selective filter film (colored in bulk) with an antireflective coating and/or with a heating coating (opposite faces)
breakage-prevention or safety film with a selective filter coating and even with an antireflective coating (same face or opposite faces).

An example of breakage-prevention film is the Solar Gard film named Armorcoat 7 Mil. Throughout the description, AR means antireflective, at least at the working wavelength.

The front plastic band is thus already bonded (entire surface or at points of the surface) to the film of the filter and/or to the assembly fine sheet (PVB). In the latter case, the front band oversteps (larger than the device), the connection between the front band and the fine sheet can be used alone to hold the film of the filter and there is no need for additional rear-face and plastic-band bonding.

The front plastic band is capable of adhesively bonding to the face F2 of the glazing by the laminating. Unlike the double-sided adhesive tape, the free face of the thermoplastic band is non-sticky and ready for use. The front plastic band according to the invention makes possible precise positioning without loss of time in-line.

It is thus possible to provide the following stack configurations (forming a preassembled element preferably):
directly on the face F2:
front band/bulk-tinted film/adhesive (PSA, and the like) or other front band/(/AR film)
front band/bulk-tinted film/(AR coating)
front band/film with coloring coating on one at least of the main faces/AR film
or on the coloring layer:
front band/AR film.

A bulk-tinted film can be said selective filter, for example the product Smoke Plus films from Solar Gard.

In the case c), the interlayer is made of PVB (colorless, acoustic, and the like). The PVB is transparent at the working wavelength.

If the interlayer has a plurality of fine sheets, it can concern a "front" fine sheet (side of face F2), preferably with a thickness of at most 0.4 mm.

The second fine sheet, for example thicker, can have an optional blind hole for receiving the film.

The PVB is preferably holed if it absorbs the working wavelength, for example such as PVB doped by ITO.

In particular, it is possible to form a following element preassembled before laminating: front PVB fine sheet/film (selective filter) and with a holed PVB fine sheet bonded to the front fine sheet.

And/or, preferably (alternatively to or cumulatively with a), b) or c), if this is compatible), the polymer film or another polymer film above said film and bonded to said film is bonded, according to one at least of the following configurations, to the face F3:
m) via an adhesion layer, such as the case a),
n) via a polymer local band, "rear band", in particular based on poly(vinyl butyral) (PVB), which is in adhesive contact with the face F3 in the border zone of said traversing hole, preferably in adhesive contact with the lamination interlayer, in particular local band overstepping the film (by at most 10 cm), the rear band being absent under said traversing hole or overstepping by at most 5 mm, the rear band is preferably in (adhesive) contact with the lamination interlayer,
o) via the lamination interlayer, preferably being based on PVB (the case o) being able to apply simultaneously with a) or b)), preferably holed in line with said traversing hole.

For n), this rear band can be over the entire circumference of the border (glass) zone of the transparent hole.

It forms a closed surface (same outline as the hole or shape encompassing the traversing hole) For example, this rear band has a width of 15 mm (for example), for example a rectangular, trapezoidal, and the like, frame.

Said rear band can overstep the selective filter (preferably by at most 5 cm, 1 cm) in order to ensure as much as possible the adhesive contact with the lamination interlayer.

The rear band can be absent under said traversing hole or overstepping by at most 5 mm, 3 mm under said traversing hole. Under and in contact with the face F3, it can also overstep the underlying film(s) (selective filter, AR film, and the like), in particular by at most 5 cm, 1 cm, in order as much as possible to come into contact with the PVB (during the laminating) or to reinforce this zone.

Opposite F3, the rear band, in particular based on poly (vinyl butyral) (PVB), can be in (lateral) adhesive contact with the lamination interlayer in order to form a continuity in material (no space between interlayer and the rear band).

The rear band, even if made of PVB, can be a PVB distinct from the PVB of the interlayer and/or at the very least with a different thickness from E3, for example thinner. The rear band (PVB)/interlayer (PVB) interface can be discernible.

Preferably, the rear band (made of) poly(vinyl butyral) (PVB) containing less than 15% by weight of plasticizers, preferably less than 10% by weight and better still less than 5% by weight and especially without plasticizer, in particular with a thickness of at most 0.5 mm, preferably at most 0.3 mm and better still of at most 0.15 mm, in particular from 25 to 100 µm, 40 to 70 µm and even of at most 50 µm, and the lamination interlayer is based (made of) on poly(vinyl butyral) (PVB)—with plasticizer, in particular with more than 15% by weight of conventional plasticizers—and in particular with a thickness of at least 0.3 mm and better still of at least 0.5 mm.

The front and/or rear local band can be based (made of) on poly(vinyl butyral) (PVB) containing less than 15% by weight of plasticizers, and especially without plasticizer, and in particular the lamination interlayer is based (made of) on poly(vinyl butyral) (PVB) with plasticizer, in particular with more than 15% by weight of plasticizers.

For example, there is present (with selective film (filter) or selective coating (selective filter) deposited on F2):
- adhesion layer, such as PSA/polymer film or stack of polymer films adhesively bonded together/adhesion layer, such as PSA, or rear band,
- front band/polymer film or stack of polymer films adhesively bonded together/adhesion layer, such as PSA, or rear band,
- adhesion layer, such as PSA/polymer film or stack of polymer films adhesively bonded together/interlayer,
- front band/polymer film or stack of polymer films adhesively bonded together/interlayer,
- front band or adhesion layer, such as PSA/polymer film or stack of polymer films adhesively bonded together/interlayer/polymer film or stack of polymer films adhesively bonded together/adhesion layer, such as PSA, or rear band,
- interlayer/polymer film or stack of polymer films adhesively bonded together/adhesion layer, such as PSA,
- interlayer/polymer film or stack of polymer films adhesively bonded together/rear band.

The lamination interlayer can be holed in line with said traversing hole and even a little beyond (in particular by at most 50 mm) extending on this side of the border zone of the hole.

The glazing can comprise at least, under said traversing hole, a multilayer which comprises a first PVB layer in adhesive contact with the face F2 forming the front band/at least one polymer film in particular forming or forming part of said selective filter or a stack of polymer films/a second PVB layer holed in line with said traversing hole forming said rear band.

The front band is in contact with the lamination interlayer, the rear band is in contact with the lamination interlayer.

The triple layer may also not incorporate the filter (case of a paint on F2, for example).

In one implementation, the selective filter comprises a polymeric film, in particular PET film, preferably with a thickness of at most 0.3 mm, 0.15 mm, comprising:
- a coloring polymeric film, in particular PET film, with a thickness of at most 0.3 mm/0.15 mm, comprising a bulk-coloring agent,
- and/or (colorless or tinted) film coated with a coloring layer made of a compound comprising a (organic, polymeric, organic/inorganic hybrid: sol-gel route) matrix and a coloring agent dispersed in said matrix, said coloring agent absorbing (substantially all of) the light located in said visible region and being (substantially) transparent at said working wavelength on a main face.

In one implementation, the selective filter comprises a layer made of a compound comprising a (organic, polymeric, inorganic or hybrid) matrix and a coloring agent dispersed in said matrix, said coloring agent absorbing (substantially all of) the light located in said visible region and being (substantially) transparent at said working wavelength, layer forming a coating in the zone of said hole:
- on the face F2
- or on the lamination interlayer, side of face FA or FB, preferably made of PVB, in particular ink additionally comprising PVB particles
- or on an additional polymeric film, in particular PET film, on a main face, side of F2 or F3, with a thickness of at most 0.3 mm, 0.15 mm, preferably bonded to the face F2.

The coloring layer can be of submillimetric thickness and even of at most 20 µm.

The compound of the coloring layer can be polymeric or organic/inorganic hybrid.

The compound/the polymeric matrix of the coloring layer is chosen from monomers, oligomers, or polymers comprising at least one methacrylate functional group, epoxides, varnishes consisting of dispersed PVB particles, latex, polyurethane or acrylate.

The selective filter can contain any pigment or dye having a greater transmittance in the infrared region than its transmittance in the visible region, such as a near infrared black ink which absorbs substantially the wavelengths in the visible region while transmitting those in the near infrared region. For example, the selective filter (as layer) can contain dyes or inks, such as the Spectre™ inks, for example Spectre™ 100, 110, 120, 130, 140, 150 or 160 (Epolin, Newark, NJ); Mimaki inks, for example Mimaki ES3, SS21, BS3, SS2 or HS (Mimaki Global, Tomi City, Nagano, Japan); or Seiko inks, for example Seiko 1000, 1300, SG700, SG740 or VIC (Seiko Advance Ltd., Japan), or also black ink IR9508 from MingBo Anti-forgery Technology Co. Ltd.

The selective filter (as layer) can contain one or more black, cyan, magenta or yellow dye components.

The selective filter (as layer) can be a coating including dyes or pigments or both. The selective layer can include Lumogen® Black FK 4280 or Lumogen Black FK 4281 (BASF, Southfield, MI).

In some examples, the selective filter (as layer) can include a multilayer film, with one or more layers of the multilayer film including dyes, pigments or both.

Preferably,
the coloring agent is chosen from Sudan Black B® or Nigrosine Solvent Black 5, and is preferably Sudan Black B®,
the coloring agent represents between 0.1% and 10% by weight of the layer, preferably between 0.2% and 3% by weight of the layer.

The selective filter (as layer) can be a varnish of less than 30 μm.

For this selective filter as layer, it is possible to vary the layer thickness or the percentage by weight of coloring agent, in particular at least from 1%, 5% to 20%, 30%.

The selective filter can comprise a polymer film, such as PET film, charged in its bulk with dyes by a roll-to-roll deep-dyeing process, in particular immersion in a hot bath with the dyes. The final concentration of dye has to be sufficient to introduce the opacity in the visible region. Reference may be made to the patent WO9307329 or U.S. Pat. No. 5,162,046.

A selective layer can be put on a polymer film, such as a PET film, per main face.

It is possible to combine a bulk-tinted polymer film, such as PET film, and a selective layer on this film, another polymer film, such as PET film, on the PVB remaining opposite said hole or on the face F2.

The lamination interlayer is a multilayer which comprises a first PVB layer in adhesive contact with the face F2/a polymer film forming or forming part of said selective filter/a second PVB layer holed in line with said traversing hole, the polymer film optionally carrying a solar control layer apart from said traversing hole.

The lamination interlayer comprises a PVB, in the zone of said traversing hole, forming part of one of the following stacks (in particular preassembled):
  p) selective filter/PVB(/antireflective element comprising in particular a PET-type polymer film)
  q) PVB/selective filter such as polymer film with coloring layer on F'A or F'B and/or bulk-tinted(/antireflective coating)
  r) PVB/selective filter such as polymer film with coloring layer on F'A or F'B and/or bulk-tinted/adhesive(/antireflective film)
  s) PVB/coloring layer(/antireflective coating), and, in the border zone of said traversing hole, it is possible to add a rear band for p), q), r).

Furthermore, the glazing according to the invention can comprise an adhesively bonded (opaque) plate on face F4 comprising a hole in line with said traversing hole (wider or in the extension of said traversing hole), in particular opaque, optionally reinforced, plastic plate, with means capable of supporting or holding a system for infrared viewing at said working wavelength, such as a LIDAR.

In particular, a plate, especially of subcentimetric thickness, in particular from 1 to 3 mm, and even from 1.5 to 2.5 mm, can be adhesively bonded to the face F4. It is, for example, made of plastic which is optionally reinforced (fibers, and the like), for example polycarbonate (PC), polymethyl methacrylate (PMMA), polyethylene (PE), polypropylene (PP), polyamide (PA66), acrylonitrile-butadiene-styrene (ABS) and their ABS-PC alloys, polystyrene (PS), acrylonitrile-styrene-acrylate ASA, based on polymer of formaldehyde (polyoxymethylene POM), on polybrominated terphenyl (PBT), preferably charged with glass fibers for even more strength, in particular PA66 GF30 (30% glass fibers).

This plate can be used to carry or contribute to holding or stabilizing the LIDAR and/or a housing masking the LIDAR. This plate can be holed in line with said traversing hole. Like said traversing hole, this plate is preferably peripheral, in particular along the upper edge of the glazing. For example, it is in the central zone, (conventional) zone of the rear-view mirror (present or absent).

It can also carry or contribute to holding or stabilizing another or other functional element(s), such as sensors, for example sensor of a camera in the visible region and/or of a thermal camera (beyond 2.5 μm, ranging at least from 9.5 to 10.5 μm and preferably from 8 to 12 μm) or any other sensor (rain, exterior brightness, and the like). It comprises as many holes as necessary (and of suitable size) for the sensor(s). It can even carry or contribute to holding or stabilizing the thermal camera or the visible camera and/or an individual housing or one shared by the LIDAR, by the thermal camera and/or by the visible camera.

If the hole is a notch, a portion of this notch will be masked by the frame of the glazing, thus nonfunctional for the viewing system. If the hole is closed is too close to the edge, it is the same.

If the hole is closed, the edge of the hole closest to the edge face of the glazing (upper longitudinal edge preferably and in particular in a central zone) is distant from this edge face of the glazing (of the second sheet) by at least 2 cm or 3 cm and better still 5 cm. The traversing hole can be in the central zone of the upper longitudinal edge of the windshield, the usual zone of the interior rear-view mirror (adjacent to the hole or rear-view mirror removed depending on the vehicles), a zone where the masking layer on the face F2 and/or FA is generally thicker than on the lateral zones bordering the upper edge (passenger, driver, and the like).

Preferably, the traversing hole exhibits a section which is in particular trapezoidal or of circular or oval type,
  with a smaller dimension of at least 2, 3, 5, 8 cm (suited to the size of the infrared viewing system, for example)—and preferably with a larger dimension (in particular large side or diameter) of at most 40 cm, 30 cm, 20 cm (for mechanical aspects)
  and preferably an antireflective coating occupies a surface area encompassing the hole and with a length of at most 30 cm.

Especially, the section of the traversing hole is a quadrilateral, in particular a rectangle or a trapezoid, with:
  a first "upper" (large) side or longitudinal edge (the closest to the edge face of the upper longitudinal edge of the glazing), preferably parallel to the edge face of the upper longitudinal edge of the glazing and with a length preferably of at most 30 cm, 20 cm or 15 cm or 12 cm and in particular spaced at least 5 cm or 6 cm from the edge face
  a second "lower" (large) side or longitudinal edge (the furthest from the edge face of the upper longitudinal edge of the glazing, closer to the central zone), preferably parallel to the edge face of the upper longitudinal edge of the glazing and with a length preferably of at most 35 cm or 30 cm or 25 cm or 20 cm and preferably larger than that of the first large side
  with a height (between these large sides) preferably of at least 5 cm and even of at most 15 cm.

If the hole is small, of at most 10, 8, 5, 2 cm, it is preferable to make a circular hole. The traversing hole is along a longitudinal edge or alternatively, the traversing hole is along a lateral edge.

In the case of a back window, the traversing hole can be peripheral along a longitudinal (in particular upper) or side edge.

Naturally, the traversing hole is an empty space or at least a space which is not filled (in its central part) by any material which absorbs in the targeted near infrared region which would be between an antireflective coating and the infrared viewing system. However, it is possible to provide an insert (closed, open) of the ring type (monolithic or in several unconnected or connected pieces, and the like), in particular with a width of at most 1.5 cm, for example made of flexible polymer material (polycarbonate, polyamide, polyolefin, polypropylene, and the like):

mounted on (in particular adhesively bonded or by force) the wall of the second glass or plastic sheet delimiting (in the top part) the hole indeed even also in contact with the wall of the lamination interlayer and even on the face F2.

This insert can extend beyond the hole, in particular over the face F4.

This insert can be used:
to place in the hole all or part of the infrared viewing system or intermediate optics between the antireflective coating and the infrared viewing system
to place in the hole all or part of the means for fixing the infrared viewing system.

If the hole of the interlayer is made before laminating and the insert is placed before the laminating at the level of the interlayer (in particular at the most 150° C. and under pressure in particular), this insert can serve to prevent or reduce the creep of the interlayer over the free surface of the antireflective coating.

In one implementation, the invention comprises, on a free surface of an element under or in said traversing hole, a coating antireflective at at least said "working" wavelength in the infrared region, with a free surface, the element being chosen from one at least of the following elements:

a polymeric film, forming all or part of the selective filter or bonded to and covering the selective filter, in particular a PET film, with a thickness of at most 0.3 μm/015 m the lamination interlayer (at most partially holed on the face FB side housing a selective filter as a film) which is bare or coated (with the active layer of the selective filter on face Fa)

coloring layer of said selective filter.

The traversing hole is preferably in a peripheral zone of the laminated glazing, preferably at the upper longitudinal edge and/or in a peripheral central region, and the antireflective coating is local and in this peripheral region.

The traversing hole exhibits a given shape, in particular of convex cross section, for example trapezoidal or rectangular or round or oval. The antireflective coating can exhibit a homothetic shape.

An AR coating can be directly on a polymer film or on a functional underlayer (including the selective coloring layer or also a layer of hard coat type).

A selective coating can be directly on a polymer film or on a functional underlayer. The first glass sheet can comprise, on a free face of an element under or in said traversing hole of the second sheet, a coating antireflective at at least one "working" wavelength in the infrared region in a range extending from 800 nm to 1800 nm, element chosen from:

a polymeric film, forming all or part of the selective filter or bonded to the selective filter or to—a polymeric film for mechanical protection which is bare or coated (with the active layer of the selective filter on the face F3 side, and the like)

the lamination interlayer (at most partially holed on the face FB side housing a selective filter as a film) which is bare or coated (with the active layer of the selective filter on face Fa)

The antireflective coating can comprise a stack of thin dielectric layers (of metal or silicon oxides and/or nitrides, for example) alternating high and low refractive indices (at the working wavelength).

The antireflective coating preferably comprises a (functional) porous silica layer, preferably a sol-gel layer.

In a first embodiment, the pores are the interstices of a noncompact stack of nanometric beads, in particular of silica, this layer being described, for example, in the document US20040258929.

In a second embodiment, the porous layer is obtained by the deposition of a condensed silica sol (silica oligomers) densified by vapors of $NH_3$ type, this layer being described, for example, in the document WO2005049757.

In a third embodiment, the porous layer can also be of sol-gel type, such as as described in the document EP 1 329 433. The porous layer can also be obtained with other known pore-forming agents: micelles of cationic surfactant molecules in solution and, optionally, in hydrolyzed form, or of anionic or nonionic surfactants, or amphiphilic molecules, for example block copolymers.

In a fourth embodiment, the porous layer can also be of sol-gel type, such as as described in the document WO2008/059170. The porous layer can thus be obtained with pore-forming agents which are preferably polymeric beads.

The antireflective coating in particular of porous silica according to the invention can have a thickness advantageously of between 10 nm and 10 μm (these limiting values being included), in particular 50 nm and 1 μm and more preferentially still between 70 and 500 nm.

The porous silica layer can exhibit closed pores of at least 20 nm, 50 nm or 80 nm; optionally, the functional layer can comprise pores with a concentration which increases in the direction of the free surface.

The pores can have an elongated shape, in particular a rice grain shape. More preferentially still, the pores can have a substantially spherical or oval shape. It is preferred for the majority of the closed pores, indeed even at least 80% of them, to have a given shape which is substantially identical, in particular elongated, substantially spherical or oval.

The antireflective coating can comprise a chemical protection underlayer, in particular with a thickness of at most 200 nm, for example, in particular a dense silica layer, by the sol-gel process, surmounted by a sol-gel porous silica functional layer.

The underlayer can be based on silica or on at least partially oxidized derivatives of silicon chosen from silicon dioxide, substoichiometric silicon oxides, or silicon oxycarbide, oxynitride or oxycarbonitride.

The underlayer proves to be of use when the underlying surface is made of soda-lime-silica glass because it acts as a barrier to alkalis.

This underlayer thus advantageously comprises Si, O, optionally carbon and nitrogen. However, it can also comprise minor materials with respect to the silicon, for example metals, such as Al, Zn or Zr. The underlayer can be deposited by the sol-gel process or by pyrolysis, in particular by gas-phase pyrolysis (CVD). This latter technique makes it possible to obtain layers made of $SiO_xC_y$, or of $SiO_2$ quite easily, in particular by deposition directly on the float glass ribbon in the case of glass substrates. However, the deposition can also be carried out by a vacuum technique, for example by cathode sputtering from an (optionally doped) Si target or from a target made of silicon suboxide (in a reactive oxidizing and/or nitriding atmosphere, for example). This underlayer preferably has a thickness of at least 5 nm, in particular a thickness of between 10 nm and 200 nm, for example between 80 nm and 120 nm.

The antireflective coating can also comprise an overlayer if it does not detrimentally affect the antireflective properties.

It is also possible to put an antireflective coating also on face F1 opposite that on the face F2 side.

The antireflective coating can have the same shape as the section of the hole, for example trapezoidal or also rectangular, and the like.

Although less preferred a priori, the antireflective coating can be solely in a central zone opposite said traversing hole; it does not overstep the traversing hole and even is spaced from the edge of the traversing hole, preferably by at most 1 cm. For example, the free surface in the traversing hole exhibits a length and/or a side of at least 5 cm, 10 cm, 15 cm and preferably of at most 30 cm.

Without departing from the scope of the invention, the interlayer can, of course, comprise several fine sheets made of thermoplastic material of different natures, for example of different hardnesses, in order to provide an acoustic function, such as, for example, described in the publication U.S. Pat. No. 6,132,882, in particular a set of PVB fine sheets of different hardnesses. Likewise, one of the glass sheets may be thinned with respect to the thicknesses conventionally used.

The interlayer can, according to the invention, exhibit a wedge shape, in particular for the purpose of an HUD (head-up display) application. Furthermore, one of the fine sheets of the interlayer can be tinted in its bulk.

Mention may be made, as ordinary lamination interlayer, in addition to PVB, of flexible used polyurethane PU, a plasticizer-free thermoplastic, such as ethylene/vinyl acetate (EVA) copolymer, an ionomer resin. These plastics have, for example, a thickness between 0.2 mm and 1.1 mm, in particular between 0.3 and 0.7 mm.

The lamination interlayer can comprise another functional plastic film (transparent, clear or tinted), for example a film made of poly(ethylene terephthalate) PET carrying a layer which is athermal, electrically conductive, and the like; for example, there is PVB/functional film/PVB between the faces F2 and F3.

The transparent plastic film can have a thickness of between 10 and 100 µm. The transparent plastic film can be more broadly made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

For instance, use may be made, for example, of a clear coated PET film, for example XIR from Eastman, a coextruded film made of PET/PMMA, for example of the SRF 3M® type, but also numerous other films (for example made of PC, PE, PEN, PMMA, PVC), which are visually as transparent as possible and which are not modified, in the autoclave, as regards their surface and their consistency.

In order to limit heating in the passenger compartment or to limit the use of air conditioning, one of the first and second sheets at least (preferably the exterior glass) is tinted, and the laminated glazing can also comprise a layer which reflects or absorbs solar radiation, preferably on face F4 or on face F2 or F3, in particular a transparent electrically conductive oxide layer, "TCO layer", (on face F4) or even a stack of thin layers comprising at least one TCO layer, or stacks of thin layers comprising at least one silver layer (on F2 or F3), the or each silver layer being positioned between dielectric layers.

It is possible to simultaneously have a (silver-containing) layer on face F2 and/or F3 and a TCO layer on face F4.

The TCO layer (layer of a transparent electrically conductive oxide) is preferably a layer of fluorine-doped tin oxide ($SnO_2$:F) or a layer of mixed indium tin oxide (ITO).

The layer which reflects or absorbs solar radiation is preferably absent opposite said traversing hole.

The glazing can thus comprise, on the face F2, a functional coating which is an athermal, in particular electrically conductive, optionally heating, functional layer, especially a stack comprising silver, which is if necessary absent from said traversing hole at least in the central zone and along the edge of the traversing hole between the face F2 and FA.

The interlayer (or any other polymer film) can comprise metal wires, in particular heating wires (face FB, face FA, and the like), in particular anchored to the surface and present or if necessary absent opposite said traversing hole of the second glass sheet. The heating wires in particular have a thickness of less than or equal to 0.1 mm, preferably of copper, tungsten, gold, silver or aluminum or alloys of at least two of these metals.

In one embodiment, a heating zone of the glazing (optionally local, opposite said traversing hole of the second glass sheet) comprises a plurality of individual metal wires, known as "heating metal wires", which connect busbars to one another. The heating current passes through these individual metal wires. The wires are advantageously very thin, so as not to, or only to very slightly, damage the transparency of the glazing. Preferably, the metal wires have a thickness of less than or equal to 0.1 mm, in particular of between 0.02 and 0.04 mm, and ideally between 0.024 mm and 0.029 mm. The metal wires preferably contain copper, tungsten, gold, silver or aluminum or an alloy of at least two of these metals. The alloy can also contain molybdenum, rhenium, osmium, iridium, palladium or platinum. The metal wires are preferably electrically insulated.

For the glass of the first glass sheet and/or of the second glass sheet, it is preferably a glass of the soda-lime-silica type.

The first glass sheet, in particular based on silica, soda-lime, soda-lime-silica (preferably), or aluminosilicate, or borosilicate, exhibits a content by weight of total iron oxide (expressed in the form $Fe_2O_3$) of at most 0.05% (500 ppm), preferably of at most 0.03% (300 ppm) and of at most 0.015% (150 ppm) and in particular of greater than or equal to 0.005%.

The second glass sheet in particular based on silica, soda-lime, preferably soda-lime-silica (and like the first glass sheet), indeed even aluminosilicate, or borosilicate, exhibits a content by weight of total iron oxide (expressed in the form $Fe_2O_3$) of at least 0.4% and preferably of at most 1.5%.

In addition, it is possible to provide, in particular on the face F2, a functional coating which is an athermal, in particular electrically conductive, optionally heating, functional layer, especially a stack comprising silver, which is absent from said traversing hole at least in the central zone and present along the edge of the traversing hole between the face F2 and FA, the selective filter optionally being in contact with the functional layer, in particular on or under the athermal functional layer.

In one configuration, the first glazing is made of mineral glass and the second glazing is made of plastic, for example thinner (film), and the like, for example made of PC, PMMA or PET. Alternatively, it is a second glass sheet.

According to the invention, in order to simplify and accelerate the manufacture of the glazing, recourse is had to an element preassembled by adhesive bonding or adhesive contact out of the lamination line.

The second glass or plastic sheet is in particular green, blue or gray. The second glass sheet can be green with iron, or also blue with CoO, or gray with Se and CoO. Mention may in particular be made of the glasses of the applicant company named TSAnx (0.5 to 0.6% of iron), TSA2+, TSA3+(0.8 to 0.9% of iron), TSA4+(1% of iron) or TSA5+, which are for example green.

TSA3+(2.1 mm), for example, has a total transmission at 905 nm of approximately 40% and at 1550 nm of approximately 50%.

The second glass sheet can exhibit a redox, being defined as being the ratio of the content by weight of FeO (ferrous iron) to the content by weight of total iron oxide (expressed in the form $Fe_2O_3$), between 0.22 and 0.35 or 0.30.

Said second glass sheet can have a chemical composition which comprises the following constituents in a content varying within the limits by weight defined below:

| | |
|---|---|
| $SiO_2$ | 64-75% |
| $Al_2O_3$ | 0-5% |
| $B_2O_3$ | 0-5% |
| CaO | 2-15% |
| MgO | 0-5% |
| $Na_2O$ | 9-18% |
| $K_2O$ | 0-5% |
| $SO_3$ | 0.1-0.35% |
| $Fe_2O_3$ (total iron) | at least 0.4% and even 0.4% to 1.5%, |
| optionally redox | 0.22-0.3 | and in particular less than 0.1% of impurities.

The interior and/or exterior glass may have undergone a chemical or heat treatment of the hardening or annealing type or a tempering (in particular for better mechanical strength) or be semitempered.

The glass of the first glass sheet and/or of the second glass sheet is preferably of the float glass type, that is to say capable of having been obtained by a process consisting in pouring the molten glass onto a bath of molten tin (float bath). "Atmosphere" and "tin" faces is understood to mean the faces which have been respectively in contact with the atmosphere prevailing in the float bath and in contact with the molten tin. The tin face contains a small superficial amount of tin which has diffused into the structure of the glass.

The face F2 can equally well be the "tin" face as the "atmosphere" face.

The first glass sheet can be, for example, a soda-lime-silica glass, such as the Diamant® glass from Saint-Gobain Glass, or Optiwhite® glass from Pilkington, or B270® glass from Schott, or Sunmax® glass from AGC, or glass of other composition described in the document WO04/025334. The Planiclear® glass from Saint-Gobain Glass can also be chosen.

With ordinary natural starting materials, the total content by weight of iron oxide is of the order of 0.1% (1000 ppm). Particularly pure starting materials can be chosen in order to lower the content of iron oxide.

In the present invention, the $Fe_2O_3$ (total iron) content of the first glass sheet is preferably less than 0.015%, indeed even less than or equal to 0.012%, in particular 0.010%, in order to increase the near infrared transmission of the glass. The $Fe_2O_3$ content is preferably greater than or equal to 0.005%, in particular 0.008%, in order not to excessively penalize the cost of the glass.

In order to increase even more the transmission of the first glass sheet in the infrared region, it is possible to reduce the content of ferrous iron in favor of the content of ferric iron, thus to oxidize the iron present in the glass. Glasses having the lowest possible "redox", ideally zero or virtually zero, are thus targeted. This number can vary between 0 and 0.9, zero redox values corresponding to a fully oxidized glass.

Glasses comprising low amounts of iron oxide, in particular less than 200 ppm, indeed even less than 150 ppm, have a natural tendency to exhibit high redox values, of greater than 0.4, indeed even than 0.5. This tendency is probably due to a shift in the oxidation/reduction equilibrium of the iron as a function of the iron oxide content. The redox of the first glass sheet is preferably greater than or equal to 0.15, and in particular between 0.2 and 0.30, in particular between 0.25 and 0.30. This is because excessively low redox values contribute to the reduction in the lifetime of the furnaces.

In the glasses according to the invention (first and even second sheet), the silica $SiO_2$ is generally kept within narrow limits for the following reasons. Above 75%, the viscosity of the glass and its aptitude for devitrification increase sharply, which makes it more difficult to melt it and to pour it onto the bath of molten tin. Below 60%, in particular 64%, the hydrolytic resistance of the glass rapidly decreases. The preferred content is between 65% and 75%, in particular between 71% and 73%.

Said first glass sheet can have a chemical composition which comprises the following constituents in a content varying within the limits by weight defined below:

| | |
|---|---|
| $SiO_2$ | 60-75% |
| $Al_2O_3$ | 0-10% |
| $B_2O_3$ | 0-5%, preferably 0% |
| CaO | 5-15% |
| MgO | 0-10% |
| $Na_2O$ | 5-20% |
| $K_2O$ | 0-10% |
| BaO | 0-5%, preferably 0%, |
| $SO_3$ | 0.1-0.4% |
| $Fe_2O_3$ (total iron) | 0% to 0.015%, |
| redox | 0.1-0.3. |

Throughout the text, the percentages are percentages by weight.

The glass sheets are preferably formed by floating on a bath of tin. Other types of forming process can be employed, such as drawing processes, down-draw process, rolling process, Fourcault process, and the like.

The glass composition of the first glass sheet can comprise, in addition to the unavoidable impurities contained in particular in the starting materials, a small proportion (up to 1%) of other constituents, for example agents aiding the melting or the refining of the glass (Cl, and the like), or also elements originating from the dissolution of refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet preferably does not comprise any agent which absorbs infrared radiation (in particular for a wavelength of between 800 and 1800 nm). In particular, the composition according to the invention preferably does not contain any of the following agents: oxides of transition elements, such as CoO, CuO, $Cr_2O_3$, NiO, $MnO_2$ or $V_2O_5$, oxides of rare earth metals, such as $CeO_2$, $La_2O_3$, $Nd_2O_3$ or $Er_2O_3$, or else coloring agents in the elemental state, such as Se, Ag or Cu. The other agents preferably excluded also include the oxides of the following elements: Sc, Y, Pr, Sm, Eu, Gd, Tb, Dy, Ho, Tm, Yb or Lu. These agents very often have an undesirable very powerful coloring effect, which is apparent at very low contents, sometimes of the order of a few ppm or less (1 ppm=0.0001%). Their presence thus very greatly reduces the transmission of the glass.

Preferably, the first glass sheet exhibits a chemical composition which comprises the following constituents in a content varying within the limits by weight defined below:

| | |
|---|---|
| $SiO_2$ | 60-75% |
| $Al_2O_3$ | 0-10% |
| $B_2O_3$ | 0-5%, preferably 0% |
| CaO | 5-15% |
| MgO | 0-10% |
| $Na_2O$ | 5-20% |
| $K_2O$ | 0-10% |
| BaO | 0-5%, preferably 0%, |
| $SO_3$ | >0.2-0.4% |
| $Fe_2O_3$ (total iron) | 0% to 0.015%, |
| redox | 0.2-0.30. |

The first glass sheet can exhibit a chemical composition which comprises the following constituents in a content varying within the limits by weight defined below:

| | |
|---|---|
| $SiO_2$ | 60-75% |
| $Al_2O_3$ | 0-10% |
| $B_2O_3$ | 0-5%, preferably 0% |
| CaO | 5-15% |
| MgO | 0-10% |
| $Na_2O$ | 5-20% |
| $K_2O$ | 0-10% |
| BaO | 0-5%, preferably 0%, |
| $SO_3$ | 0.1-0.4% |
| $Fe_2O_3$ (total iron) | 0% to 0.02%, |
| redox | 0.15-0.3. |

In the present invention, the $Fe_2O_3$ (total iron) content is preferably less than 0.015%, indeed even less than or equal to 0.012%, in particular 0.010%, this being in order to increase the near infrared transmission of the glass. The $Fe_2O_3$ content is preferably greater than or equal to 0.005%, in particular 0.008%, in order not to excessively penalize the cost of the glass.

The redox is preferably greater than or equal to 0.15, and in particular between 0.2 and 0.30, in particular between 0.25 and 0.30. This is because excessively low redox values contribute to the reduction in the lifetime of the furnaces.

In the glasses according to the invention, the silica $SiO_2$ is generally kept within narrow limits for the following reasons. Above 75%, the viscosity of the glass and its aptitude for devitrification increase sharply, which makes it more difficult to melt it and to pour it onto the bath of molten tin. Below 60%, in particular 64%, the hydrolytic resistance of the glass rapidly decreases. The preferred content is between 65% and 75%, in particular between 71% and 73%.

Other preferred compositions according to the invention are reproduced below:

| | |
|---|---|
| $SiO_2$ | 65-75% |
| $Al_2O_3$ | 0-3% |
| CaO | 7-12% |
| MgO | 2-5% |
| $Na_2O$ | 10-15% |
| $K_2O$ | 0-5% |
| $SO_3$ | 0.1-0.3% |
| $Fe_2O_3$ (total iron) | 0% to less than 0.015%, |
| redox | 0.1-0.3. |

Other preferred compositions according to the invention are reproduced below:

| | |
|---|---|
| $SiO_2$ | 65-75% |
| $Al_2O_3$ | 0-5% |
| CaO | 7-12% |
| MgO | 1-5% |
| $Na_2O$ | 10-15% |
| $K_2O$ | 0-5% |
| $SO_3$ | 0.2-0.4% |
| $Fe_2O_3$ (total iron) | 0% to less than 0.015%, |
| redox | 0.1-0.3. |

Naturally, the most desired application is for the glazing to be a windshield of a road vehicle (automobile) or even a (moderate speed) rail vehicle.

The invention also relates to a vehicle, in particular an autonomous or semiautonomous vehicle, incorporating the vehicle glazing according to the invention, in particular forming a windshield.

The invention also relates to a device, in particular a (road) vehicle, which comprises:
  the glazing as described above
  a system for infrared viewing at said working wavelength, such as a LIDAR, positioned in the passenger compartment behind said glazing so as to send and/or receive radiation after passing through the first glass sheet at the level of said traversing hole.

As regards the manufacture, for a degassing, the structure to be laminated in a drying oven can be placed in a pocket.

The laminating can be a heat treatment under pressure and/or under vacuum at a temperature of at most 200° C. or 130° C. and even of at least 100° C., 120° C. An autoclave can be used.

The invention relates to a process for the manufacture of said laminated glazing as described above, such that:
  before laminating, opposite said traversing hole and in a border zone of said traversing hole, the face F2 comprising an element (stack, and the like) including said selective filter, like a polymer film, in particular polyester or PET film, or a stack of polymer film(s) adhesively bonded, in particular by a PSA adhesive, element with a total thickness of at most 0.2 mm and even of at most 0.15 mm, the lamination interlayer, in particular PVB, which has a single fine sheet or a plurality of fine sheets, comprises an "interlayer" traversing hole opposite said traversing hole of the second sheet and in the border zone of said traversing hole, the face FA being on said element and in particular the face FB on the face F3,
  after said laminating, the interlayer hole optionally oversteps by at most 5 mm said traversing hole of the second (glass) sheet.

The invention relates to a process for the manufacture of said laminated glazing as described above, such that:

before laminating, opposite said traversing hole and in a border zone of said traversing hole, the face F2 comprising an element including said selective filter, like a polymer film, in particular polyester or PET film, or a stack of polymer film(s) adhesively bonded, in particular by a PSA adhesive, element in particular with a total thickness of at least 0.2 mm, the lamination interlayer, in particular PVB, which has a single fine sheet or a plurality of fine sheets, comprises an "interlayer" traversing hole opposite said traversing hole of the second sheet and in a border zone of said traversing hole said element is in said interlayer hole and in the border zone of said traversing hole, is present between the element and the face F3 said rear band preferably after said laminating at the level of said interlayer hole, the element is in adhesive contact with the interlayer and/or the rear band is in adhesive contact with the interlayer and optionally oversteps by at most 5 mm into the traversing hole of the second (glass) sheet.

The invention relates to a process for the manufacture of said laminated glazing as described above, such that:

before laminating, opposite said traversing hole and in a border zone of said traversing hole, the face F2 comprising an element (stack, and the like) including said selective filter, like a polymer film, in particular polyester or PET film, or a stack of polymer film(s) adhesively bonded, in particular by a PSA adhesive, element in particular with a total thickness of at least 0.2 mm, the lamination interlayer, in particular PVB, comprises a first fine sheet or first plurality of fine sheets, a first "interlayer" traversing hole opposite said traversing hole of the second sheet and in a border zone of said traversing hole said element is in said interlayer hole the lamination interlayer comprises a second fine sheet exhibiting a second interlayer hole which is not as broad as the first hole and in the border zone of said traversing hole between the element and the face F3 preferably after said laminating at the level of said first interlayer hole, the element is in adhesive contact with the interlayer the second interlayer hole optionally oversteps by at most 5 mm into the traversing hole of the second (glass) sheet.

In addition, before the formation of the structure to be laminated (first sheet, interlayer, second sheet, including an element made of polymer film(s) and with the selective filter), said element comprising said front band and/or said rear band is preassembled.

It may be preferred to preassemble the selective film with the (dielectric, and the like) adhesion layer which is, for example, protected by a removable film (liner) to be withdrawn before positioning between the first and second sheets.

In order to simplify and accelerate the manufacture of the glazing, it may be preferred to use an element preassembled by adhesive bonding or adhesive contact out of the lamination line.

The following double layer is preassembled, for example: front PVB band/selective film, and this very double layer can be placed on and bonded to an interlayer PVB fine sheet (holed or not under said traversing hole) or a rear PVB band, for example with local heating.

In particular, it is possible to form a following element preassembled before laminating: front PVB fine sheet/film (selective filter) and with a holed PVB fine sheet bonded to the front fine sheet.

Certain advantageous but nonlimiting embodiments of the present invention are described below, which can, of course, be combined with one another, if appropriate.

FIG. 1 diagrammatically represents, in partial sectional view, a windshield 100 in a first embodiment of the invention with an infrared viewing system 7, such as a LIDAR.

FIG. 1' is a detailed view of FIG. 1.

FIG. 1a is a partial front view of the windshield (passenger compartment side) of FIG. 1.

FIG. 1b diagrammatically represents, in front view (exterior side), the windshield 100 of FIG. 1.

FIG. 1c diagrammatically represents, in front view (exterior side), the windshield 100 of FIG. 1 in an alternative form.

FIG. 1d diagrammatically represents, in front view (exterior side), the windshield 100 of FIG. 1 in an alternative form.

FIG. 1e diagrammatically represents, in front view (exterior side), the windshield 100 of FIG. 1 in an alternative form.

FIG. 2 diagrammatically represents, in partial and detailed sectional view, around the traversing hole of a windshield 200 in a second embodiment of the invention.

FIG. 3 diagrammatically represents, in partial and detailed sectional view, around the traversing hole of a windshield 300 in a third embodiment of the invention.

FIG. 3' diagrammatically represents, in front view (passenger compartment side), the windshield 300 of FIG. 3.

Figure 4:
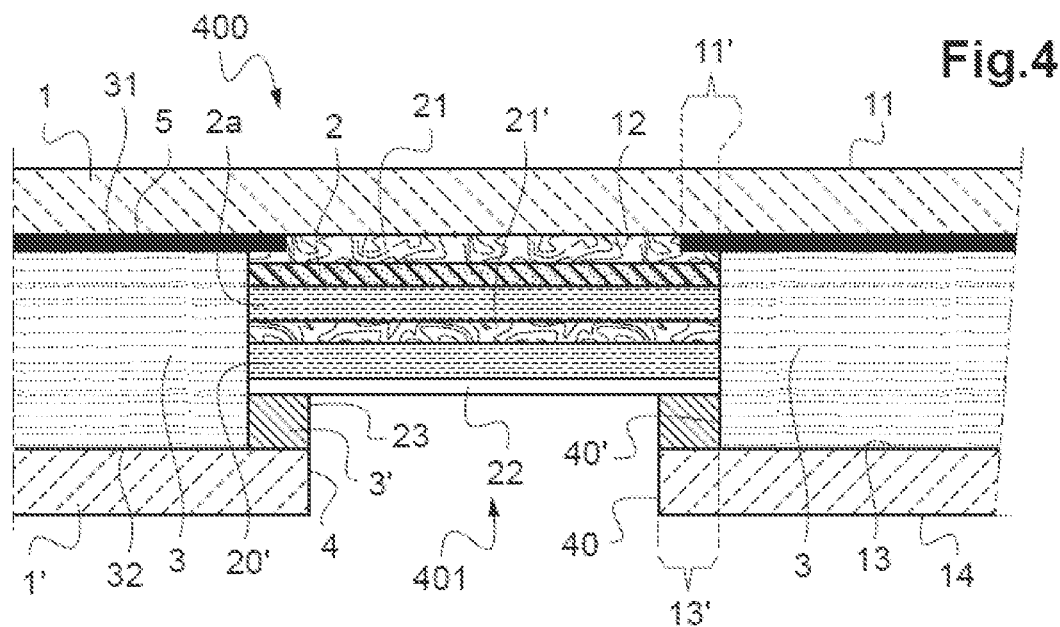

FIG. 4 diagrammatically represents, in partial and detailed sectional view, around the traversing hole of a windshield 400 in a fourth embodiment of the invention.

Figure 5:
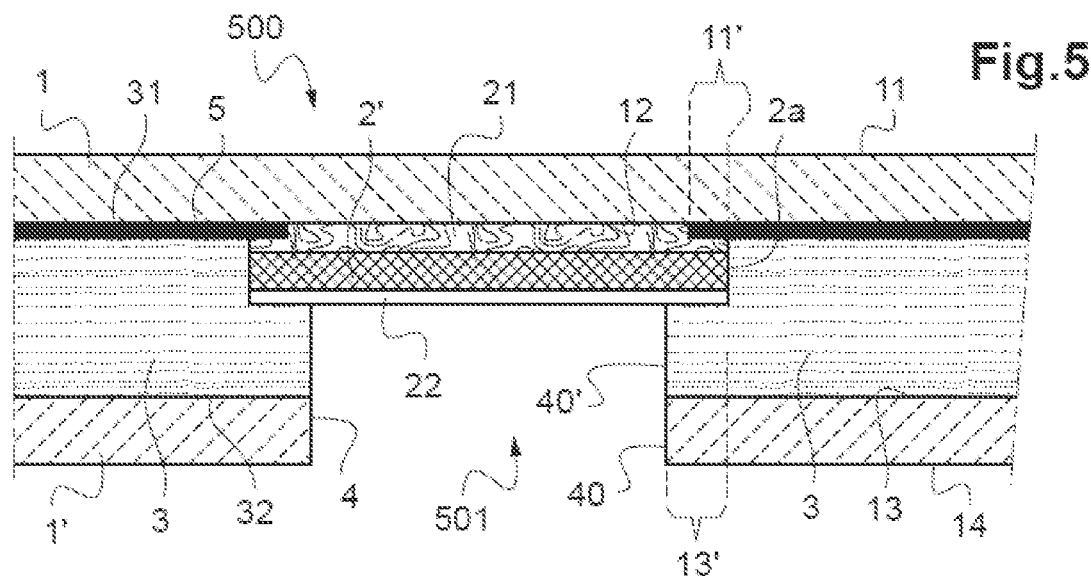

FIG. 5 diagrammatically represents, in partial and detailed sectional view, around the traversing hole of a windshield 500 in a fifth embodiment of the invention.

FIG. 6 diagrammatically represents, in partial and detailed sectional view, around the traversing hole of a windshield 600 in a sixth embodiment of the invention.

FIG. 6a diagrammatically represents, in partial and detailed sectional view, around the traversing hole of a windshield 600a in a first alternative form of the sixth embodiment of the invention.

Figure 6B:
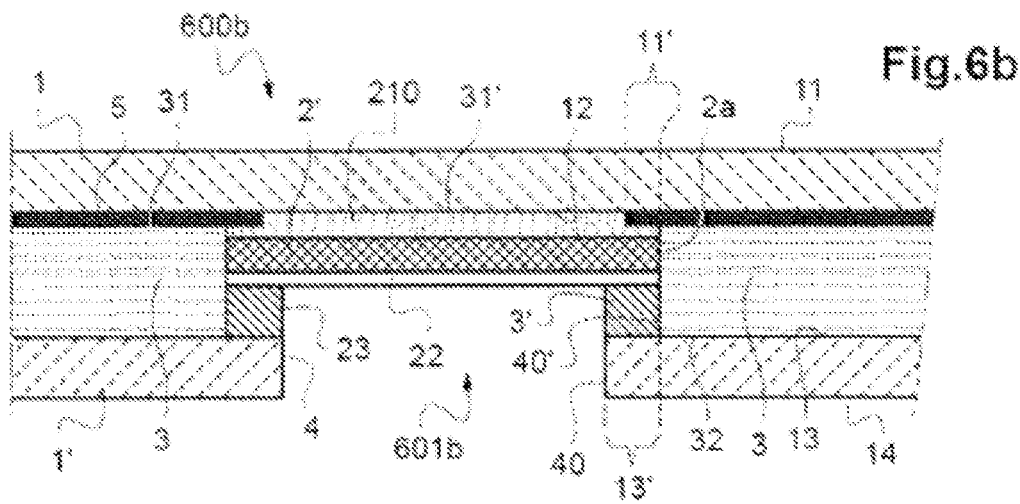

FIG. 6b diagrammatically represents, in partial and detailed sectional view, around the traversing hole of a windshield 600b in a second alternative form of the sixth embodiment of the invention.

Figure 6C:
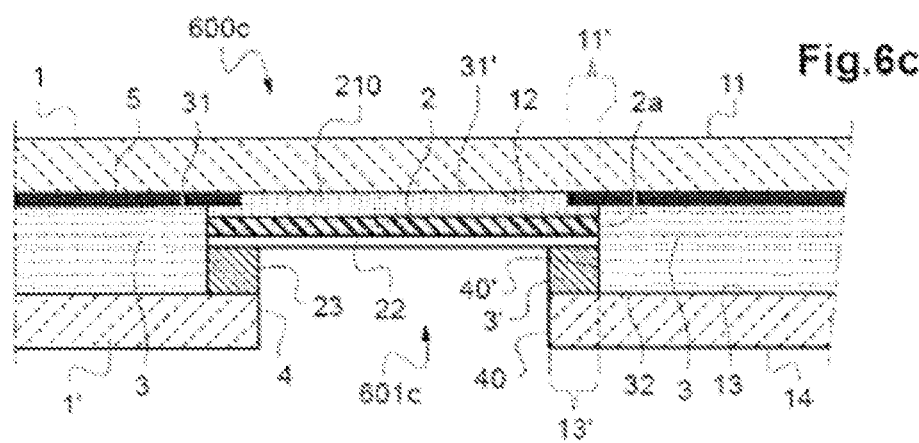

FIG. 6c diagrammatically represents, in partial and detailed sectional view, around the traversing hole of a windshield 600c in a third alternative form of the sixth embodiment of the invention.

FIG. 7 diagrammatically represents, in partial and detailed sectional view, around the traversing hole of a windshield 700 in a seventh embodiment of the invention.

FIG. 7' a partial front view of the windshield (passenger compartment side) of FIG. 7.

FIG. 8 diagrammatically represents, in partial and detailed sectional view, around the traversing hole of a windshield 800 in an eighth embodiment of the invention.

FIG. 9 diagrammatically represents, in partial and detailed sectional view, around the traversing hole of a windshield 900 in a ninth embodiment of the invention.

FIG. 9' diagrammatically represents, in partial and detailed sectional view, around the traversing hole of a windshield 900' in an alternative form of the ninth embodiment of the invention.

The figures are not to scale.

FIG. 1 diagrammatically represents a windshield 100 according to the invention, in section with a system for infrared viewing 7, such as a LIDAR, at 850 nm or 905 nm or 1550 nm. FIG. 1' is a detailed view of FIG. 1 and the view 1a a partial front view of the windshield of FIG. 1. FIG. 1' is a detailed view of FIG. 1. FIG. 1a is a partial front view of the windshield (passenger compartment side) of FIG. 1.

FIG. 1b diagrammatically represents, in front view (exterior side), the windshield 100 of FIG. 1.

This viewing system 7 is placed behind the windshield opposite a zone which is preferably located in the central and upper part of the windshield. In this zone, the infrared viewing system 7 is oriented with a certain angle with respect to the surface of the windshield (face F2). In particular, the LIDAR can be oriented directly toward the image capture zone, along a direction parallel or close to parallel with the ground, that is to say slightly inclined toward the road.

The windshield is a laminated glazing comprising:
- an external glass sheet 1, with exterior face "F1" 11 and interior face "F2" 12
- and an internal glass sheet 1' (or, in an alternative form, plastic sheet), for example with a thickness of 1.6 mm or even less, with exterior face "F3" 13 and interior face "F4" 14 on the passenger compartment side
- the two glass sheets being connected to each other by an interlayer made of thermoplastic material 3, generally made of polyvinyl butyral (PVB), which is preferably clear, with a submillimetric thickness, optionally exhibiting a cross section which decreases in wedge shape from the top toward the bottom of the laminated glazing, for example a PVB (RC41 from Solutia or from Eastman) with a thickness of approximately 0.76 mm, and/or, in an alternative form, if necessary, an acoustic (three-layer or four-layer) PVB, for example with a thickness of approximately 0.81 mm, for example an interlayer made of three PVB fine sheets or also PVB/functional PET (solar control, and the like)/PVB trilayer.

In a conventional and well-known way, the windshield is obtained by hot lamination of the elements 1, 1' and 3. A clear PVB of 0.76 mm is chosen, for example. If the PVB opposite the traversing hole is retained, it is preferred to be the most transparent at the working wavelength.

The first glass sheet 1, in particular based on silica, soda-lime, soda-lime-silica (preferably), aluminosilicate or borosilicate, exhibits a content by weight of total iron oxide (expressed in the form of $Fe_2O_3$) of at most 0.05% (500 ppm), preferably of at most 0.03% (300 ppm) and of at most 0.015% (150 ppm) and in particular of greater than or equal to 0.005%. The first glass sheet can exhibit a redox of greater than or equal to 0.15, and in particular of between 0.2 and 0.30, in particular between 0.25 and 0.30.

In particular, an Optiwhite glass of 1.95 mm is chosen.

The second glass sheet 1', in particular based on silica, soda-lime, preferably soda-lime-silica (and like the first glass sheet), indeed even aluminosilicate, or borosilicate, exhibits a content by weight of total iron oxide of at least 0.4% and preferably of at most 1.5%. The second glass sheet can exhibit a redox between 0.22 and 0.35 or 0.30. Mention may in particular be made of the glasses of the applicant company named TSAnx (0.5 to 0.6% of iron), TSA2+, TSA3+ (0.8 to 0.9% of iron), TSA4+ (1% of iron) or TSA5+, which are for example green. A TSA3+ glass of 1.6 mm is chosen.

The first glass sheet comprises, on the face F2, a stack 101 transparent at at least one "working" wavelength in the infrared region of between 800 nm and 1800 nm, in particular between 850 nm and 1600 nm, with a surface which is free (not covered by the lamination interlayer and the second glass or plastic sheet), by means of a traversing hole 4 in the thickness of the second glass or plastic sheet, thus a hole delimited by the walls 40, and in this instance of an optional "interlayer" traversing hole, delimited by the walls 40'.

According to the invention, in a peripheral central region along the upper longitudinal edge, the windshield thus comprises a traversing hole 4 in the thickness of the second glass or plastic sheet 1' and optionally of the lamination interlayer 3. The infrared viewing system 7 is opposite the traversing hole 4.

As shown in FIGS. 1a to 1e, the hole 4 is in this instance a closed hole (framed by the wall of the glass sheet), thus within the glazing in particular—of trapezoidal or rectangular section (FIG. 1e)—comprising:
- a first "upper" large side or longitudinal edge closest to the edge face of the upper longitudinal edge of the glazing 10—parallel to this edge face with a length of at most 20 cm, for example 10.6 cm, and spaced by at least 5 cm or 6 cm from the edge face
- a second "lower" large side or longitudinal edge (furthest from the edge face of the upper longitudinal edge 10, close to the central zone) parallel to the first large side with a length of at most 25 cm or 20 cm, for example 17.5 cm, and spaced by at least 5 cm or 6 cm from the edge face
- with a height (between the large sides) of at least 5 cm, in this instance of 10 cm.

The traversing hole can be circular, in particular if it has a diameter of at most 10 cm, 8, 5 or 2 cm.

The traversing hole 4 can alternatively be a notch, thus an emerging traversing hole preferably on the roof side.

The traversing hole 4 can be in another region of the windshield 100 (cf. offset toward a lateral edge 10'; cf. FIG. 1e, which exhibits two possible zones for the hole 4), or even in another glazing of the vehicle, in particular the back window.

The stack 101 is also local. In this instance, it has a rectangular shape present opposite said hole 4 and in a border zone of said hole, for example its edges overstepping by at most 10 mm the walls delimiting the hole 4 between the face F2 and F3.

The windshield 100 comprises, on the face F2 12, an opaque masking layer, which is for example black, 5, such as an enamel layer or a lacquer, forming a peripheral frame of the windshield (or of the back window) and in the peripheral zone with the traversing hole, in this instance central zone with more extended masking, it comprises a gap 51' large enough not to hamper the performance qualities of the LIDAR 7 but capable of masking the housing 8 (plastic, metal, and the like) of the LIDAR 7.

The housing 8 and even the LIDAR can be fixed (adhesively bonded, and the like) to a plate 8' holed in line with said hole on the face F4 by an adhesive 6 (and optionally to the roof 9).

In this instance, the stack 101 is on the face F2 and slightly overlaps the masking layer 5 in the border region of the traversing hole 4 (zone 11') in order to mask its edges.

The masking layer 5 has a top edge 50 and a bottom edge 51 in the central zone. The bottom edge 52 of the masking layer 5 on either side of the central zone is closer to the edge face 10.

The stack 101 comprises, starting from the face 12 F2:
- a coloring layer 2 forming a selective filter for hiding the hole 4 from the outside by filling in at least the gap 51' and beyond a PSA adhesive 21, for example acrylate, deposited by the liquid route (with withdrawn protective liner) with a thickness of 10 µm a transparent PET film 20 with an antireflective coating 22 at the working wavelength.

For example, an AR film named Diamox AR1617 from Diamond Coatings is chosen. The coloring layer 2 is made of a compound, for example polymer compound, comprising an organic matrix and a coloring agent, preferably organic coloring agent, dispersed in said matrix, said coloring agent absorbing the light located in said visible region and being transparent at said working wavelength.

The coloring agent is chosen, for example, from Sudan Black B® or Nigrosine Solvent Black 5, and is preferably Sudan Black B®.

The compound is preferably chosen from monomers, oligomers, or polymers comprising at least one methacrylate functional group, epoxides, a varnish consisting of dispersed PVB particles, latex, polyurethane or acrylate.

For the effectiveness of the selective filter as layer, it is possible to vary the layer thickness or the percentage by weight of coloring agent.

The selective filter (as layer) can be less than 100 µm or even 30 µm (varnish, and the like).

Opposite said traversing hole, the laminated glazing exhibits:

a total transmission of at least 80%, 90% or 95% at the working wavelength, measured at 90° a total transmission of at most 10%, 5%, 1% or 0.1% in the visible region.

As shown in FIGS. 1b to 1e, seen from the outside, there thus appears to be a black (or of another color) continuous masking layer in the rearview mirror zone (or along the edge) and on either side in the rearview mirror zone in the form of a masking band 50'. The selective filter is defined by an L*1, a*1, b*1, defined in the L*a*b* CIE 1976 chromatic space. The masking layer of color C1 also is defined by an L*2, a*2, b*2 with a colorimetric difference ΔE* given by the following formula:

$$\Delta E^* = \sqrt{(\Delta L^{*2} + \Delta a^{*2} + \Delta b^{*2})}.$$

Preferably ΔE*<4, better still ΔE*<2 (the human eye detects with difficulty), better still ΔE*<1 (the human eye does not detect).

The stack 101 can have the same shape 2a as the hole 4: trapezoidal (FIG. 1b) or rectangular (FIG. 1e, first case along the edge, FIGS. 1c and 1d), encompassing the hole (trapezoidal or, in an alternative form not shown, circular).

The gap 51' can have the same shape as the hole 4: trapezoidal (FIG. 1b, 1c) or rectangular (FIG. 1d), encompassing the hole (trapezoidal or, in an alternative form not shown, circular).

The gap 51' is shown closed but can be emerging and filled in by the coloring layer 2. In FIG. 1e, the masking layer 5 does not comprise a gap (or even excessive thickness to form the camera zone. The coloring layer 2 is nearby, preferably slightly spaced, to maintain, if necessary, a continuity in masking.

The zone of the coloring layer can be sufficiently extended beyond said traversing hole to be used in a camera zone comprising one or more sensors.

In this case, as shown in FIGS. 1d and 1e for a requirement of transparency in the visible region of these sensors, the stack 101 (or at least the layer 2) is "patterned" (structured), thus exhibits, for example, a first opening 24 for a visible camera and another, smaller, opening 25 for the thermal camera or also other sensors (light, exterior brightness, and the like).

The windshield 100 can comprise a set of virtually invisible metal wires, for example of 50 µm, which are installed, for example, on the face FA or FB, face F3 side, of the lamination interlayer 3 (over the entire surface), in the form of lines which are or are not straight. These wires can be absent from the traversing hole 4 if they harm the LIDAR.

In the detailed view (FIG. 1'), it is seen that the face FA covers the border of the stack under the border zone of the traversing hole in a zone 13'. The traversing hole of the lamination interlayer can yield by a few mm.

During the manufacture, if the stack 101 is thin, for example of at most 0.2 mm, the PVB with traversing hole (for example 0.38 mm or 0.76 mm) is on the stack and by yielding it comes into adhesive contact with the face F2 and the edge face 2a of the stack (lateral contact).

The presence of a film opposite said traversing hole forms a safety element.

FIG. 2 diagrammatically represents, in partial and detailed sectional view, around the traversing hole of a windshield 200 in a second embodiment of the invention.

The stack 201 differs from the preceding 101 in that it comprises a selective film, that is to say a transparent PET film 20, carrying, on one at least of its main faces, in this instance oriented toward F2, the coloring layer 2 already described.

This selective film is adhesively bonded, by an acrylate PSA adhesive 21, to the face F2.

The presence of a film opposite said traversing hole forms a safety element. On the opposite face (oriented toward the face F3), the PET film 20 preferably comprises an AR coating 22, for example by alternation of high and low index layer or also a porous, in particular sol-gel, layer of silica with hollow particles (of silica, and the like).

If the stack is fairly thin (of at most 200 µm, for example), it does not create an excessive thickness troublesome at the time of the laminating If the stack is thicker, recourse may be had to a first PVB with a first traversing hole and to a second PVB (in particular thinner) having a second traversing hole which is not as broad in order to cover the border of the AR layer 22 (without notably overstepping opposite said traversing hole of the second sheet).

FIG. 3 diagrammatically represents, in partial and detailed sectional view, around the traversing hole of a windshield 300 in a third embodiment of the invention.

FIG. 3' diagrammatically represents, in front view (passenger compartment side), the windshield 300 of FIG. 3.

The stack 301 differs from the preceding 201 in that it is thicker; for example, the film 20 has a reinforced breakage-prevention function and is thick, of at least 300 or 400 µm.

It also differs from the preceding stack in that it is bonded in the border region of the traversing hole not by PVB but by a rear band 3', which is for example thin, of less than 0.2 mm, with an edge face on the traversing hole side 23, for example plasticizer-free PVB, over the entire circumference of the traversing hole and in adhesive contact via its internal edge face with the PVB 3 (interface discernible, for example). The front band has, for example, a rectangular outline encompassing the trapezoidal (or circular) traversing hole.

Selective film/band can be preassembled before formation of the laminated structure.

FIG. 4 diagrammatically represents, in partial and detailed sectional view, around the traversing hole of a windshield 400 in a fourth embodiment of the invention.

The stack 401 differs from the stack 301 in that it comprises a stack of polymer films adhesively bonded to the face F2 12 and adhesively bonded together by a PSA adhesive 21, 21':
the first film is selective
the second film is an AR film 20', 22

Alternatively, a breakage-prevention film and a selective film are chosen.

Alternatively, a breakage-prevention film and an AR film are chosen.

The PVB has a main face FA 31, F2 12 side, and FB 32, F3 13 side.

FIG. 5 diagrammatically represents, in partial and detailed sectional view, around the traversing hole of a windshield 500 in a fifth embodiment of the invention.

The stack 501 differs from the stack 201 in that the first film is selective by being bulk-tinted. It may be desired to retain the coloring layer, if need be.

Alternatively, a rear band is used, as for the preceding stack 401.

FIG. 6 diagrammatically represents, in partial and detailed sectional view, around the traversing hole of a windshield 600 in a sixth embodiment of the invention.

The stack 601 differs from the stack 201 in that the first selective film is adhesively bonded to the face F2 by a front band 210, which is for example thin, of less than 0.2 mm, for example plasticizer-free PVB. The front band has a face 31' in adhesive contact with the face 12.

It is possible to choose the same PVB (type) for front band and rear band 3'.

FIG. 6a diagrammatically represents, in partial and detailed sectional view, around the traversing hole of a windshield 600a in a first alternative form of the sixth embodiment of the invention.

The stack 601a differs from the stack 601 in that it comprises two films adhesively bonded by a PSA adhesive 21': the selective film 20 and then the AR film 20', 22.

FIG. 6b diagrammatically represents, in partial and detailed sectional view, around the traversing hole of a windshield 600b in a second alternative form of the sixth embodiment of the invention.

The stack 601b differs from the stack 601 in that it comprises a bulk-tinted selective film 2' still with the anti-reflective coating 22 and the front band 210.

FIG. 6c diagrammatically represents, in partial and detailed sectional view, around the traversing hole of a windshield 600c in a third alternative form of the sixth embodiment of the invention.

The stack 601c differs from the stack 601 in that it comprises a film with AR coating 22 with, on the face, face F2 12 side, the coloring layer 2.

FIG. 7 diagrammatically represents, in partial and detailed sectional view, around the traversing hole of a windshield 700 in a seventh embodiment of the invention.

FIG. 7' is a partial front view of the windshield (passenger compartment side) of FIG. 7.

The PVB interlayer 3 is retained in the zone under said traversing hole 4. In this zone and along the edge, the face FA 31 is in contact with the coloring layer 2 deposited on the face F2 12 or on the face FA (ink). In this zone and along the edge, the face FB 32 is in adhesive contact with an AR film carrying a rear band 3' with an edge face 23 and in adhesive contact with the face F3 13 and overstepping the edge face 2b of the film 20'.

FIG. 8 diagrammatically represents, in partial and detailed sectional view, around the traversing hole of a windshield 800 in an eighth embodiment of the invention.

The stack 801 differs from the stack 701 in that the coloring layer 2 is moved the face FB side under the film 20. The rear band is not overstepping.

FIG. 9 diagrammatically represents, in partial and detailed sectional view, around the traversing hole of a windshield 900 in a ninth embodiment of the invention.

The stack 901 is the same as the stack 801 but the PVB is a PVB1 3b with an edge face 40' on the side of the hole of the glass and the face 32/functional PET 20a with a solar control layer 5'/PVB2 3a with an edge face 40' on the side of the hole of the glass and the face 31 trilayer, PVB trilayer holed in line with said traversing hole and its border on the side of the face FB and below the PET 20.

A rear band might be added for greater sturdiness.

FIG. 9' diagrammatically represents, in partial and detailed sectional view, around the traversing hole of a windshield 900' in an alternative form of the ninth embodiment of the invention.

The windshield 900' differs from the windshield 900 in that only the PVB2 is the solar control layer (face FB side) is omitted opposite said traversing hole. The PVB2 was holed and then assembled with the PET 20a already carrying the selective layer 2 and an AR overlayer 22.

The invention claimed is:

1. A laminated glazing for a vehicle, the laminated glazing of given thickness and comprising:
a first glass sheet intended to be an exterior glazing with a first external main face F1 and a second internal main face F2;
a lamination interlayer made of polymer material with a main face FA oriented toward the second internal main face F2 and with a main face FB opposite to the main face FA, of given thickness E3, and
a second glass or plastic sheet intended to be an interior glazing with a third main face F3, oriented toward the second internal main face F2, and a fourth internal main face F4
wherein:
the first glass sheet exhibits a content by weight of total iron oxide of at most 0.05%,
the second glass or plastic sheet exhibits a traversing hole in a thickness of the second glass or plastic sheet, with a width W1 which is at least centimetric,
the laminated glazing exhibits, under said traversing hole on a side of the second internal main face F2, a selective filter which absorbs in a visible region and which is transparent at at least one working wavelength in an infrared region in a range extending from 800 nm to 1800 nm, said selective filter having a main surface that is positioned to face the traversing hole,
opposite said traversing hole, the laminated glazing that faces the traversing hole exhibits:
a total transmission of at least 80% at the working wavelength, measured at 90°, and
a total transmission of at most 10% in the visible region.

2. The vehicle laminated glazing as claimed in claim 1, wherein the selective filter extends beyond said traversing hole.

3. The vehicle laminated glazing as claimed in claim 1, wherein the selective filter extends beyond said traversing hole, wherein the selective filter exhibits at least one local opening or discontinuity to allow passage of light rays.

4. The vehicle laminated glazing as claimed in claim 1, further comprising a peripheral opaque masking layer in a region of said traversing hole, the peripheral opaque masking layer exhibiting a gap in line with said traversing hole and optionally along an edge of the traversing hole, and wherein along the edge of the traversing hole the selective filter being opposite the peripheral opaque masking layer.

5. The vehicle laminated glazing as claimed in claim 1, wherein the selective filter is in contact with a masking layer which is in the form of at least one coating on one of at least one of the first glass sheet and second glass or plastic sheet and/or on the lamination interlayer.

6. The vehicle laminated glazing as claimed in claim 1, wherein the second internal main face F2 opposite a zone of said traversing hole comprises at least one polymer film which comprises at least two functions chosen from the following: selective filter, heating, antireflection, breakage-prevention.

7. The vehicle laminated glazing as claimed in claim 1, wherein, under said traversing hole, the selective filter is bonded to the second internal main face F2.

8. The vehicle laminated glazing as claimed in claim 1, wherein the selective filter extends beyond said traversing hole into a border zone of said traversing hole, and in said border zone of said traversing hole the selective filter is bonded to the second internal main face F2.

9. The vehicle laminated glazing as claimed in claim 1, wherein, opposite said traversing hole, the vehicle laminated glazing further comprises at least one functional polymer film transparent at the working wavelength chosen from: a selective filter film, a safety film of at least 150 µm, a heating film, an AR film, optionally several of said films being adhesively bonded by a PSA adhesive, the at least one functional polymer film being bonded to the second internal main face F2.

10. The vehicle laminated glazing as claimed in claim 1, comprising at least one polymer film of submillimetric thickness: with a front main face F'A, oriented toward the second internal main face F2, and an opposite rear main face F'B, the at least one polymer film being transparent at said working wavelength, the at least one polymeric film being bonded to the second internal main face F2 which is bare or with a functional coating opposite said traversing hole, the at least one polymeric film being bonded following one at least of the following configurations:
   a) via an adhesion layer,
   b) via a polymer local front band in adhesive contact with the second internal main face F2 opposite said traversing hole, or
   c) via the lamination interlayer,
   and/or wherein said at least one polymer film or another polymer film above said at least one polymer film and bonded to said at least one polymer film is bonded, according to one at least of the following configurations, to the third main face F3:
   m) via an adhesion layer,
   n) via a polymer local rear band, which is in adhesive contact with the third main face F3 in a border zone of said traversing hole, or
   o) via the lamination interlayer.

11. The vehicle laminated glazing as claimed in the claim 10, wherein the polymer local front and/or rear local band is based on poly(vinyl butyral) (PVB) containing less than 15% by weight of plasticizers.

12. The vehicle laminated glazing as claimed in claim 10, wherein the lamination interlayer exhibits a partial or traversing interlayer hole in its thickness under said traversing hole, wherein the vehicle laminated glazing comprises at least under said interlayer hole a multilayer which comprises: a first PVB layer in adhesive contact with the second internal main face F2 forming the polymer local front band/at least one polymer film forming or forming part of said selective filter or a stack of polymer films/a second PVB layer holed in line with said traversing hole forming said polymer local rear band, and wherein the polymer local front band is in adhesive contact with the lamination interlayer.

13. The vehicle laminated glazing as claimed in claim 1, wherein the lamination interlayer exhibit a partial or traversing hole in its thickness facing said traversing hole, optionally with a size of less than at most 5 mm in said traversing hole.

14. The vehicle laminated glazing as claimed in claim 1, wherein the lamination interlayer is a multilayer which comprises a first PVB layer in adhesive contact with the second internal main face F2/a polymer film forming or forming part of said selective filter/a second PVB layer holed in line with said traversing hole, the polymer film optionally carrying a solar control layer apart from said traversing hole.

15. The vehicle laminated glazing as claimed in claim 1, wherein the selective filter comprises a polymeric film comprising:
   a bulk-coloring agent, said bulk-coloring agent absorbing the light located in said visible region and being transparent at said working wavelength, and/or
   coated with a coloring layer made of a compound comprising a matrix and a coloring agent dispersed in said matrix, said coloring agent absorbing light located in said visible region and being transparent at said working wavelength.

16. The vehicle laminated glazing as claimed in claim 1, wherein the selective filter comprises a coloring layer made of a compound comprising a matrix and a coloring agent dispersed in said matrix, said coloring agent absorbing light located in said visible region and being transparent at said working wavelength, the coloring layer forming, in a zone of said hole, a coating:
   on the second internal main face F2, or
   on the lamination interlayer, or
   on an additional polymeric film, on the second or third main face with a thickness of at most 0.3 mm or 0.15 mm.

17. The vehicle laminated glazing as claimed in claim 15, wherein the compound of the coloring layer is polymeric or organic/inorganic hybrid.

18. The vehicle laminated glazing as claimed in claim 17, wherein the coloring agent represents between 0.1% and 10% by weight of the coloring layer.

19. The vehicle laminated glazing as claimed in claim 1, comprising, on a free surface of an element under said traversing hole, a coating antireflective at at least said working wavelength in the infrared region, with a free surface
   the element being chosen from one at least of the following elements:
   a polymeric film,
   the lamination interlayer,
   a coloring layer of said selective filter.

20. The vehicle laminated glazing as claimed in claim 1, comprising a plate adhesively bonded on the fourth internal main face F4 comprising a hole in line with said traversing hole.

21. The vehicle laminated glazing as claimed in claim 1, comprising, in the traversing hole, an insert.

22. A vehicle comprising the vehicle laminated glazing as claimed in claim 1 claims, in particular forming a windshield.

23. A device comprising:
said vehicle laminated glazing as claimed in claim 1, and
a system for infrared viewing at said working wavelength positioned in a passenger compartment behind said vehicle laminated glazing so as to send and/or receive radiation after passing through the first glass sheet at a level of said traversing hole.

24. The vehicle laminated glazing as claimed in claim 2, wherein, from an outside, the selective filter extends an opaque masking layer for said glazing or masks a gap in an peripheral opaque masking layer of said glazing.

25. The vehicle laminated glazing as claimed in claim 24, wherein the selective filter is defined by an $L*1$, $a*1$, $b*1$ and the opaque masking layer being defined by an $L*2$, $a*2$, $b*2$, wherein a colorimetric difference $\Delta E*$ is <4, where $\Delta E* = \sqrt{((L*1-L*2)^2+(a*1-a*2)^2+(b*1-b*2)^2)}$.

26. The vehicle laminated glazing as claimed in claim 16, wherein the coating is ink additionally comprising PVB particles.

27. A laminated glazing for a vehicle, the laminated glazing of given thickness and comprising:
a first glass sheet intended to be an exterior glazing with a first external main face F1 and a second internal main face F2;
a lamination interlayer made of polymer material with a main face FA oriented toward the second internal main face F2 and with a main face FB opposite to the main face FA, of given thickness E3, and
a second glass or plastic sheet intended to be an interior glazing with a third main face F3, oriented toward the second internal main face F2, and a fourth internal main face F4 wherein:
the first glass sheet exhibits a content by weight of total iron oxide of at most 0.05%,
the second glass or plastic sheet exhibits a traversing hole in a thickness of the second glass or plastic sheet, with a width W1 which is at least centimetric,
the laminated glazing exhibits, under said traversing hole on a side of the second internal main face F2, a selective filter which absorbs in a visible region and which is transparent at at least one working wavelength in an infrared region in a range extending from 800 nm to 1800 nm, said selective filter having a main surface that is positioned to face the traversing hole,
opposite said traversing hole, a portion of the laminated glazing that faces the traversing hole exhibits:
a total transmission of at least 80% at the working wavelength, measured at 90°, and
a total transmission of at most 10% in the visible region, and
wherein the second glass sheet exhibits a content by weight of total iron oxide of at least 0.40%.

28. The vehicle laminated glazing as claimed in claim 1, when at least a portion of the lamination interlayer or another interlayer is arranged between said main surface and the second glass or plastic sheet.

* * * * *